US012730857B2

(12) United States Patent
Ertl

(10) Patent No.: US 12,730,857 B2
(45) Date of Patent: Sep. 8, 2026

(54) OPTIMIZED UNBIASED STATISTICAL ANALYSIS OF PARTIALLY SAMPLED TRACES WITHOUT COMPLETENESS INFORMATION

(71) Applicant: Dynatrace LLC, Waltham, MA (US)

(72) Inventor: Otmar Ertl, Linz (AT)

(73) Assignee: Dynatrace LLC, Boston, MA (US)

( * ) Notice: Subject to any disclaimer, the term of this patent is extended or adjusted under 35 U.S.C. 154(b) by 527 days.

(21) Appl. No.: 18/215,880

(22) Filed: Jun. 29, 2023

(65) Prior Publication Data

US 2024/0004956 A1 Jan. 4, 2024

Related U.S. Application Data

(60) Provisional application No. 63/367,503, filed on Jul. 1, 2022.

(51) Int. Cl.
*G06F 15/173* (2006.01)
*G06F 17/40* (2006.01)

(52) U.S. Cl.
CPC .................................... *G06F 17/40* (2013.01)

(58) Field of Classification Search
CPC ....................................................... G06F 17/40
USPC ......................................................... 709/224
See application file for complete search history.

(56) References Cited

U.S. PATENT DOCUMENTS 8,234,631 B2 7/2012 Greifeneder et al.
11,210,156 B1 * 12/2021 Liu .................... G06F 11/0739
11,409,634 B2 * 8/2022 Nguyen .............. G06F 11/3006
11,438,239 B2 9/2022 Arnold et al.
11,797,418 B1 * 10/2023 Tyrewalla ........... G06F 11/0772
2017/0078137 A1 * 3/2017 Spiegl ................. G06F 11/3006

(Continued)

OTHER PUBLICATIONS

Edith Cohen, Nick Duffield, Haim Kaplan, Carsten Lund, and Mikkel Thorup. 2009. Stream sampling for variance-optimal estimation of subset sums. Arxiv, see https://arxiv.org/abs/0803.0473.

(Continued)

*Primary Examiner* — Alan S Chou
(74) *Attorney, Agent, or Firm* — Harness, Dickey & Pierce, PLC

(57) ABSTRACT

A technology is disclosed for maximizing the creation of transaction trace data by multiple, different monitoring data sources like agents having individual volume constraints for created trace data. Trace context data identifying individual transactions and containing shared randomness data is propagated between agents and used in created trance data to maintain transaction identity in trace data fragments and for consistent sampling decisions. Sampling decisions for individual trace data fragments are based on the shared randomness data and on an agent-autonomously defined sampling probability. Values of randomness data and sampling probability are restricted to a limited number, like the values of a geometric series with a common ratio of 1/2. Shared randomness data and sampling probability are included in created trace data. Restricting randomness data and sampling probability to values of a geometric series with common ratio 1/2 leads to additional numeric advantages for the computer implemented calculation of estimation results.

15 Claims, 10 Drawing Sheets

System Overview

(56) References Cited

U.S. PATENT DOCUMENTS

2018/0373580 A1* 12/2018 Ertl ..................... G06F 11/3433
2020/0409933 A1* 12/2020 Ertl ..................... G06F 11/3006

OTHER PUBLICATIONS

Schaller P. Shan, B. Viscomi, V. Venkataraman, K. Veeraraghavan, and Y. J. Song. 2017. Canopy: An End-to-End Performance Tracing and Analysis System. In Proceedings of the 26th Symposium on Operating Systems Principles (SOSP). 34-50. See https://people.mpi-sws.org/~jcmace/papers/kaldor2017canopy.pdf.

S. Kanzhelev, M. McLean, A. Reitbauer, B. Drutu, N. Molnar, and Y. Shkuro. W3C Trace Context Specification. Nov. 2021. See https://www.w3.org/TR/2020/REC-trace-context-1-20200206/#sampled-flag.

P. Las-Casas, J. Mace, D. Guedes, and R. Fonseca. 2018. Weighted Sampling of Execution Traces: Capturing More Needles and Less Hay. See https://people.mpi-sws.org/~jcmace/papers/lascasas2018weighted.pdf.

P. Las-Casas, G. Papakerashvili, V. Anand, and J. Mace. 2019. Sifter: Scalable Sampling for Distributed Traces, without Feature Engineering. In Proceedings of the 10th ACM Symposium on Cloud Computing (SoCC). See https://people.mpi-sws.org/~jcmace/papers/lascasas2019sifter.pdf.

J. MacDonald. 2021. Probability sampling of telemetry events. See https://github.com/open-telemetry/oteps/blob/928ea4fb66a2c1a0eb3400fda99ed290a2c42a73/text/0148-sampling-probability.md#dappers-inflationary-sampler.

L. Molkova. 2020. Associating sampling score with the trace. See https://github.com/open-telemetry/oteps/blob/0721be603a8f80bc7c1a648957e5c3b5f04fcb11/text/trace/0107-sampling-score.md.

R. R. Sambasivan, I. Shafer, J. Mace, B. H. Sigelman, R. Fonseca, and G. R. Ganger. 2016. Principled Workflow-Centric Tracing of Distributed Systems. In Proceedings of the 7th ACM Symposium on Cloud Computing (SoCC). See https://cs.brown.edu/~jcmace/papers/sambasivan16principled.pdf.

B. H. Sigelman, L. A. Barroso, M. Burrows, P. Stephenson, M. Plakal, D. Beaver, S. Jaspan, and C. Shanbhag. 2010. Dapper, a Large-Scale Distributed Systems Tracing Infrastructure. Technical Report. See: https://research.google.com/archive/papers/dapper-2010-1.pdf.

* cited by examiner

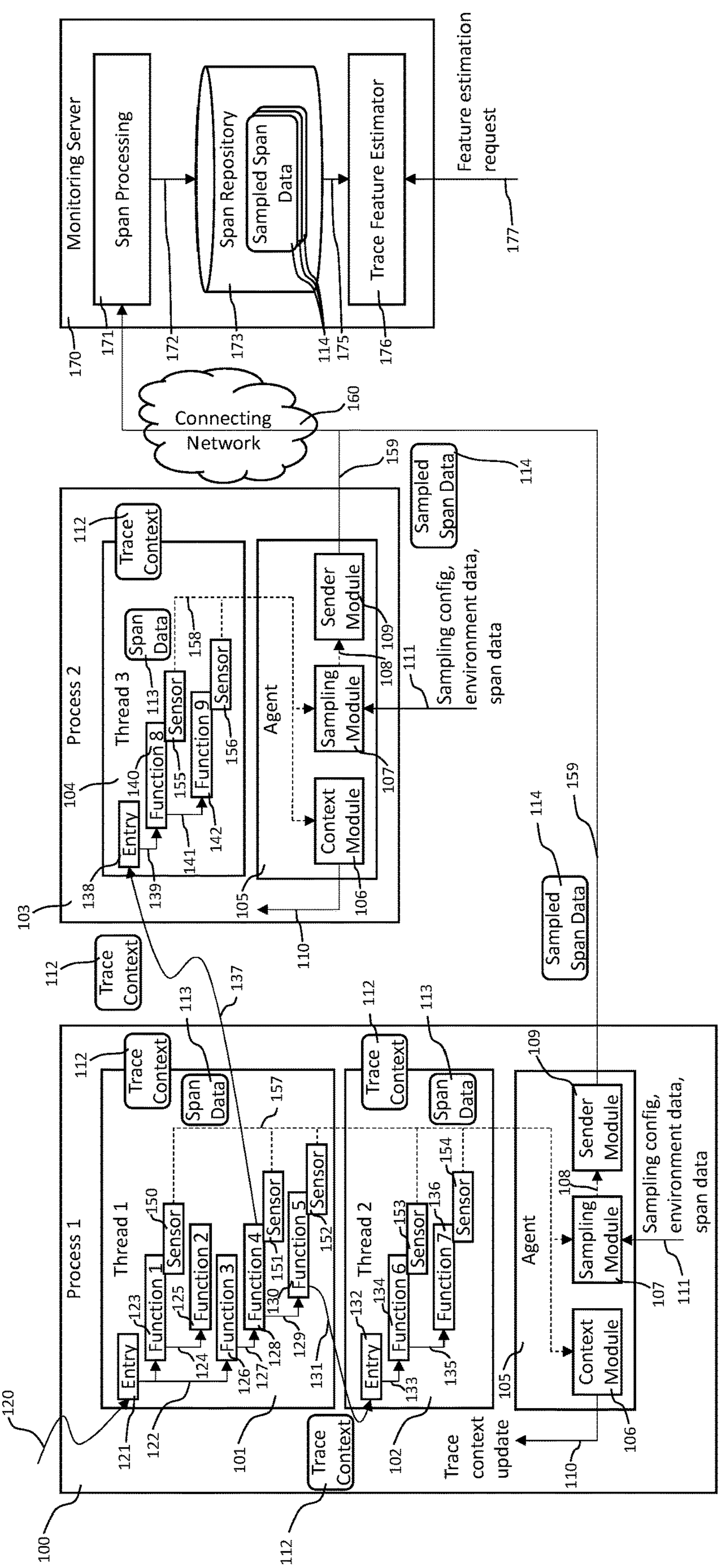
FIG 1: System Overview

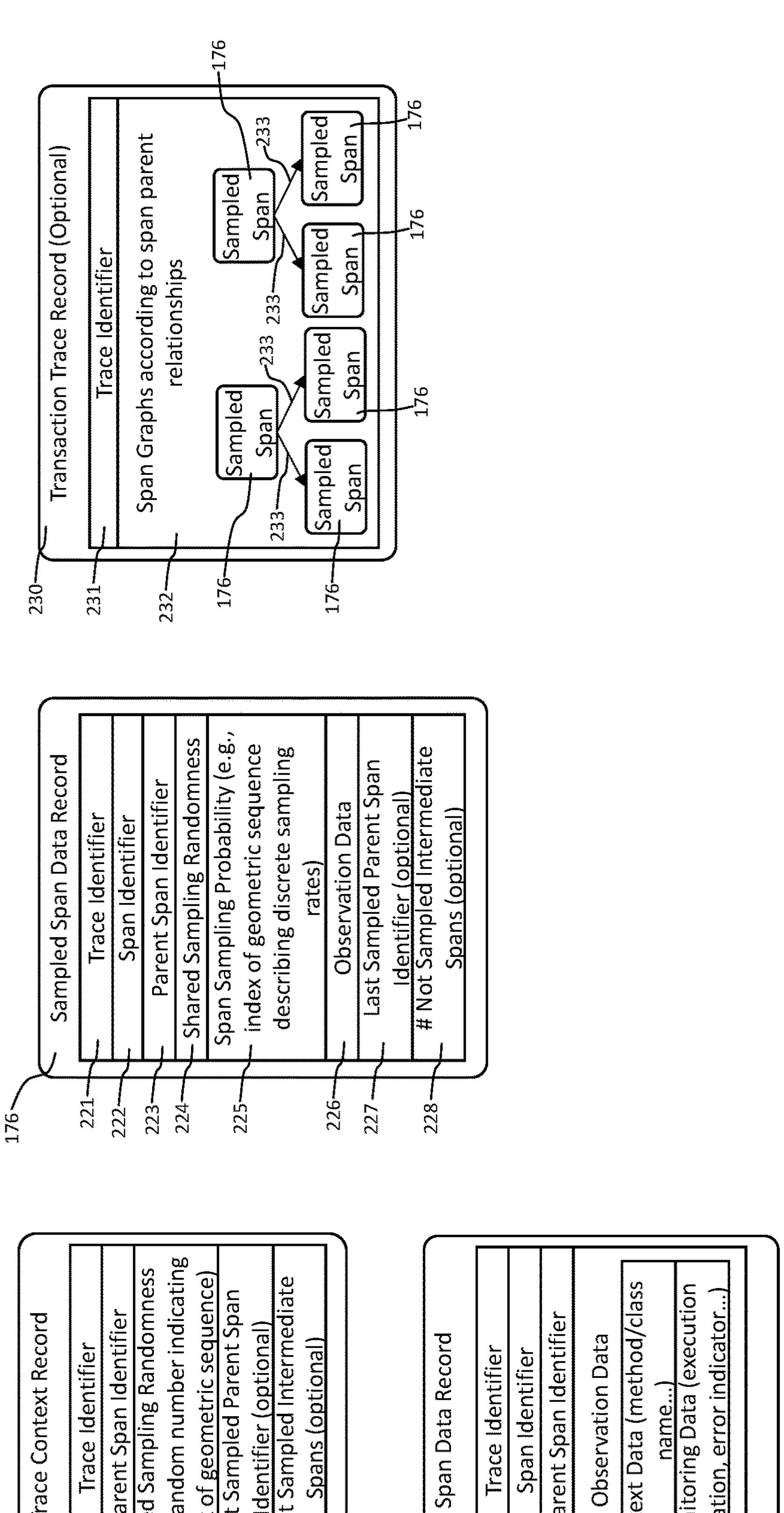
FIG. 2 Data Records

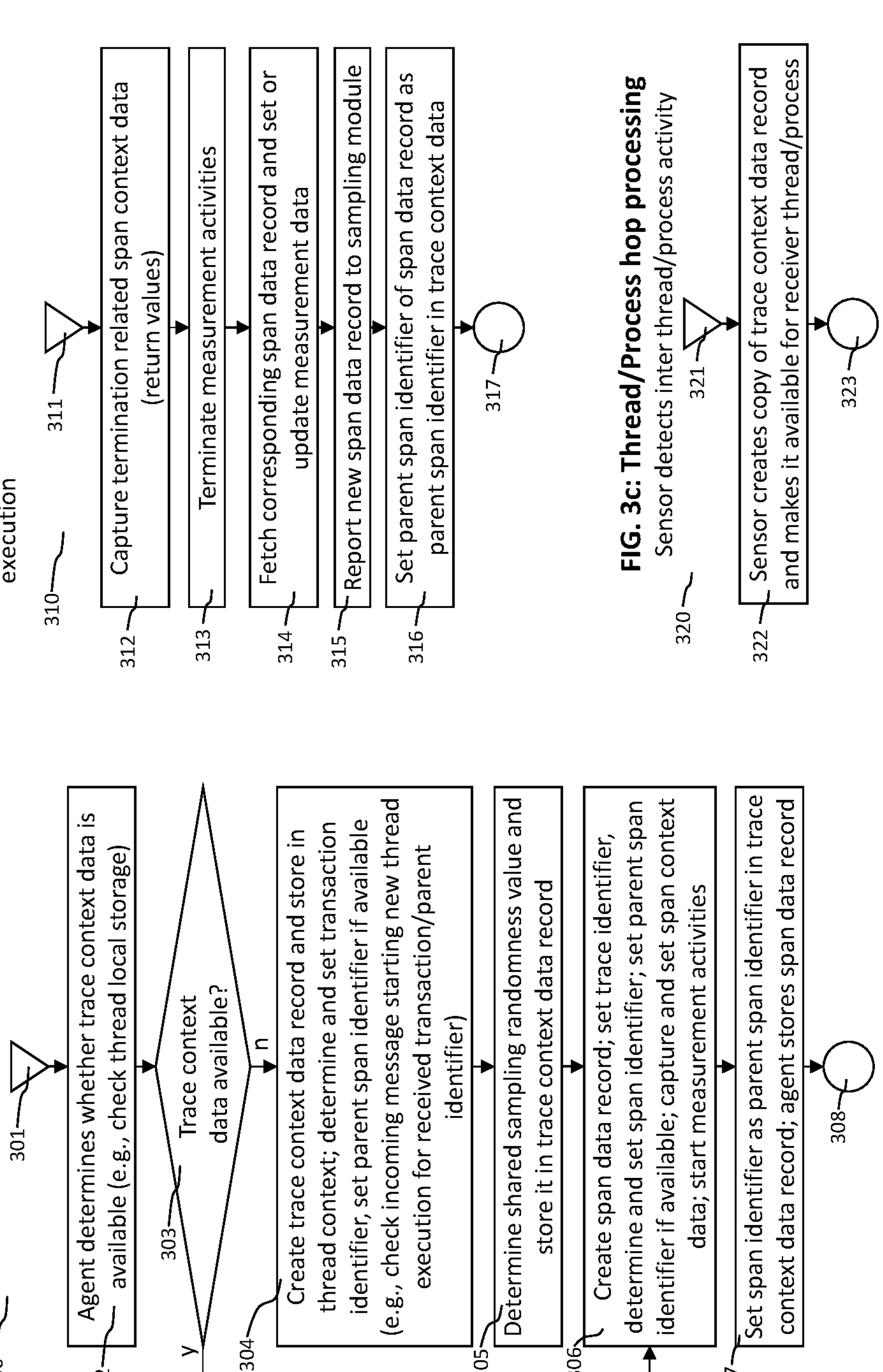
Agent Side Span Data Processing
FIG. 3a: Processing of span start notification
300
Sensor reports start of new method execution
301
Agent determines whether trace context data is available (e.g., check thread local storage)
302
Trace context data available?
303
y
n
Create trace context data record and store in thread context; determine and set transaction identifier, set parent span identifier if available (e.g., check incoming message starting new thread execution for received transaction/parent identifier)
304
Determine shared sampling randomness value and store it in trace context data record
305
Create span data record; set trace identifier, determine and set span identifier; set parent span identifier if available; capture and set span context data; start measurement activities
306
Set span identifier as parent span identifier in trace context data record; agent stores span data record
307
308
FIG. 3b: Processing of span end notification
310
Sensor reports termination of method execution
311
Capture termination related span context data (return values)
312
Terminate measurement activities
313
Fetch corresponding span data record and set or update measurement data
314
Report new span data record to sampling module
315
Set parent span identifier of span data record as parent span identifier in trace context data
316
317
FIG. 3c: Thread/Process hop processing
320
Sensor detects inter thread/process activity
321
Sensor creates copy of trace context data record and makes it available for receiver thread/process
322
323

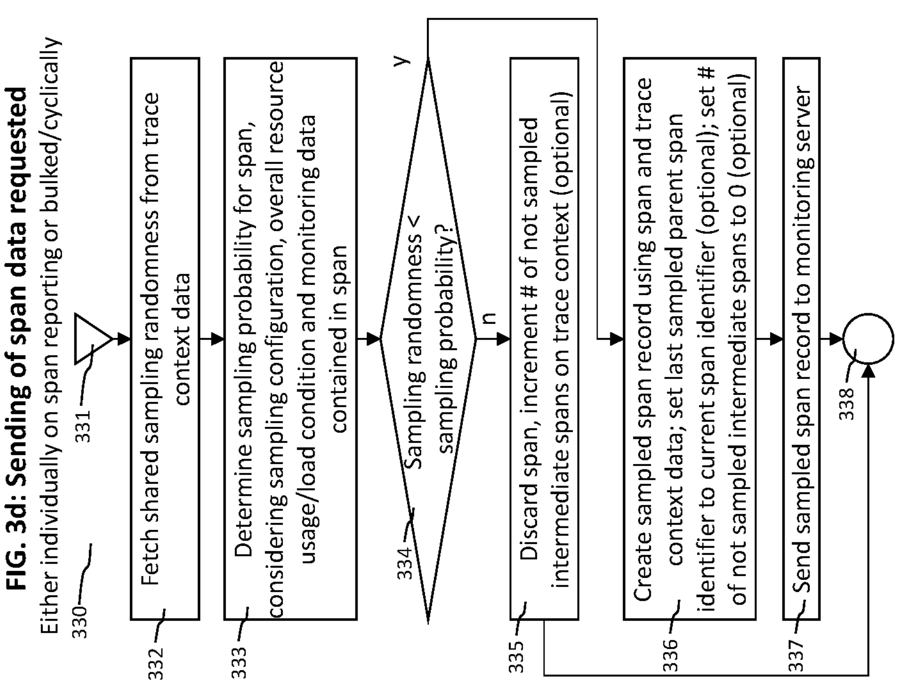

Agent Side Span Data Processing
FIG. 3d: Sending of span data requested
Either individually on span reporting or bulked/cyclically
330
331
Fetch shared sampling randomness from trace context data
332
Determine sampling probability for span, considering sampling configuration, overall resource usage/load condition and monitoring data contained in span
333
Sampling randomness < sampling probability?
334
y
n
Discard span, increment # of not sampled intermediate spans on trace context (optional)
335
Create sampled span record using span and trace context data; set last sampled parent span identifier to current span identifier (optional); set # of not sampled intermediate spans to 0 (optional)
336
Send sampled span record to monitoring server
337
338

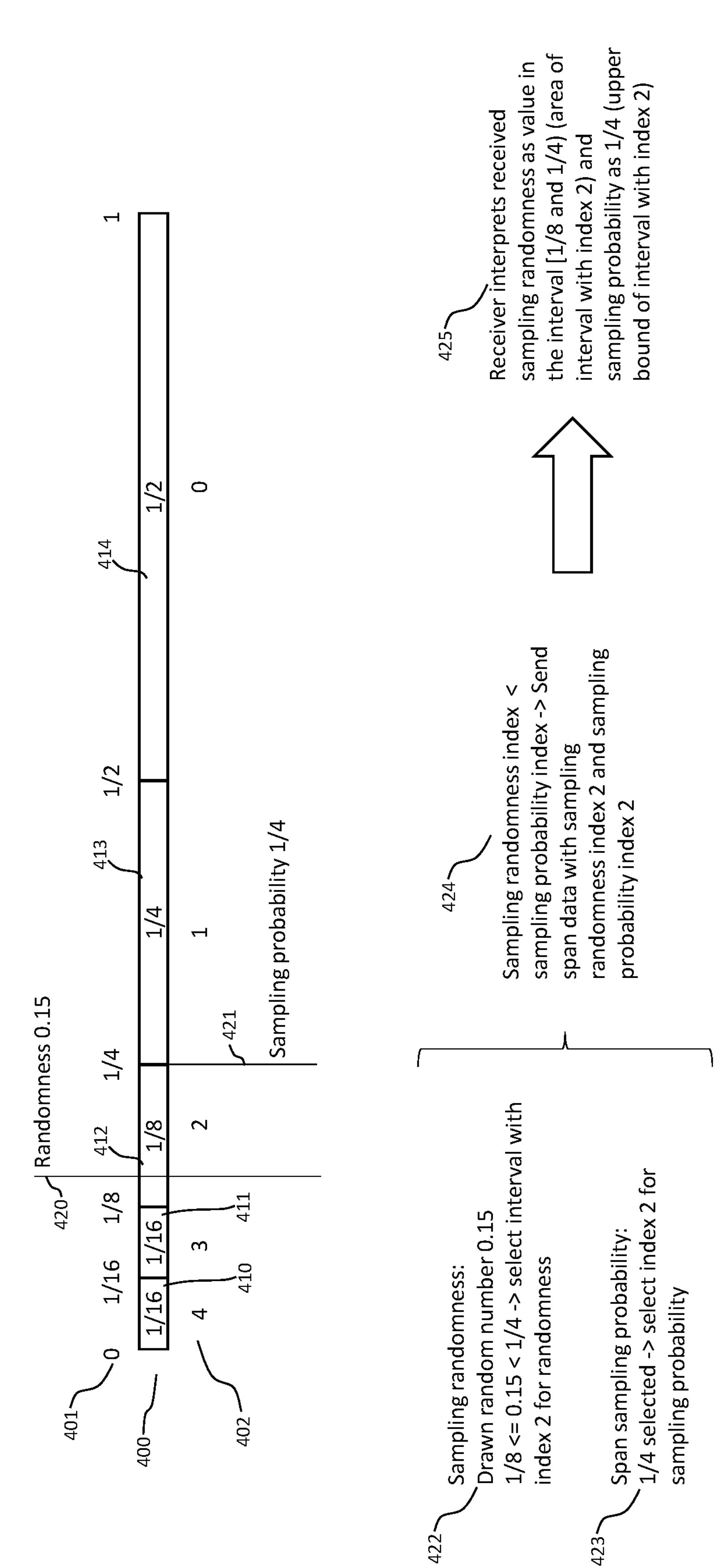
FIG. 4 Space Optimized Sampling Configuration Using Geometric Sequence, Explained By Example Agent Side Emulation of Arbitrary Sampling Rates

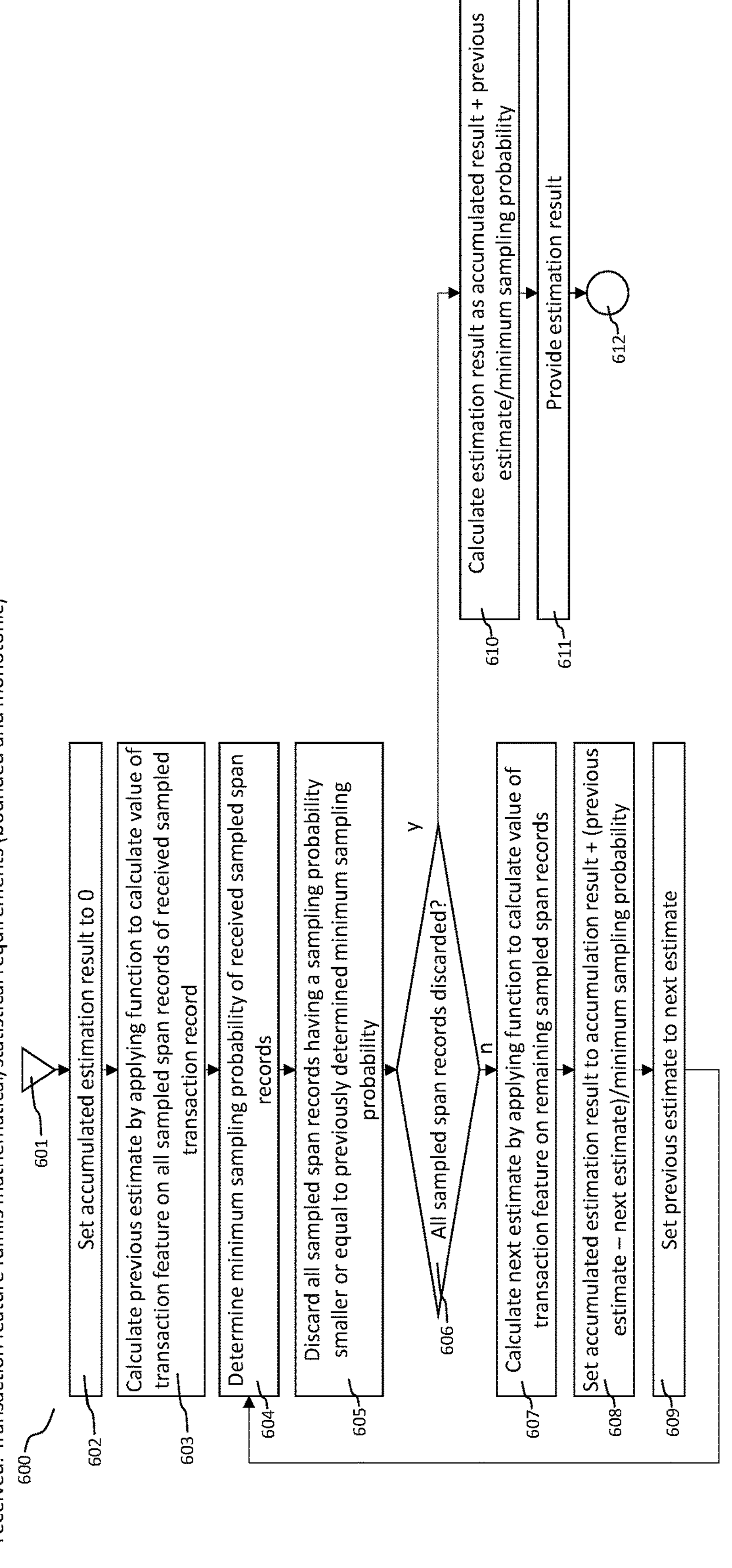
FIG. 6 Unbiased estimation of transaction features from sampled span data
Estimating value for transaction features from incomplete/sampled span data
Sampled span data for transaction (identified by trace identifier) and transaction feature for value estimation received. Transaction feature fulfills mathematical/statistical requirements (bounded and monotonic)
600
601
Set accumulated estimation result to 0
602
Calculate previous estimate by applying function to calculate value of transaction feature on all sampled span records of received sampled transaction record
603
Determine minimum sampling probability of received sampled span records
604
Discard all sampled span records having a sampling probability smaller or equal to previously determined minimum sampling probability
605
All sampled span records discarded?
606
y
n
Calculate next estimate by applying function to calculate value of transaction feature on remaining sampled span records
607
Set accumulated estimation result to accumulation result + (previous estimate – next estimate)/minimum sampling probability
608
Set previous estimate to next estimate
609
Calculate estimation result as accumulated result + previous estimate/minimum sampling probability
610
Provide estimation result
611
612

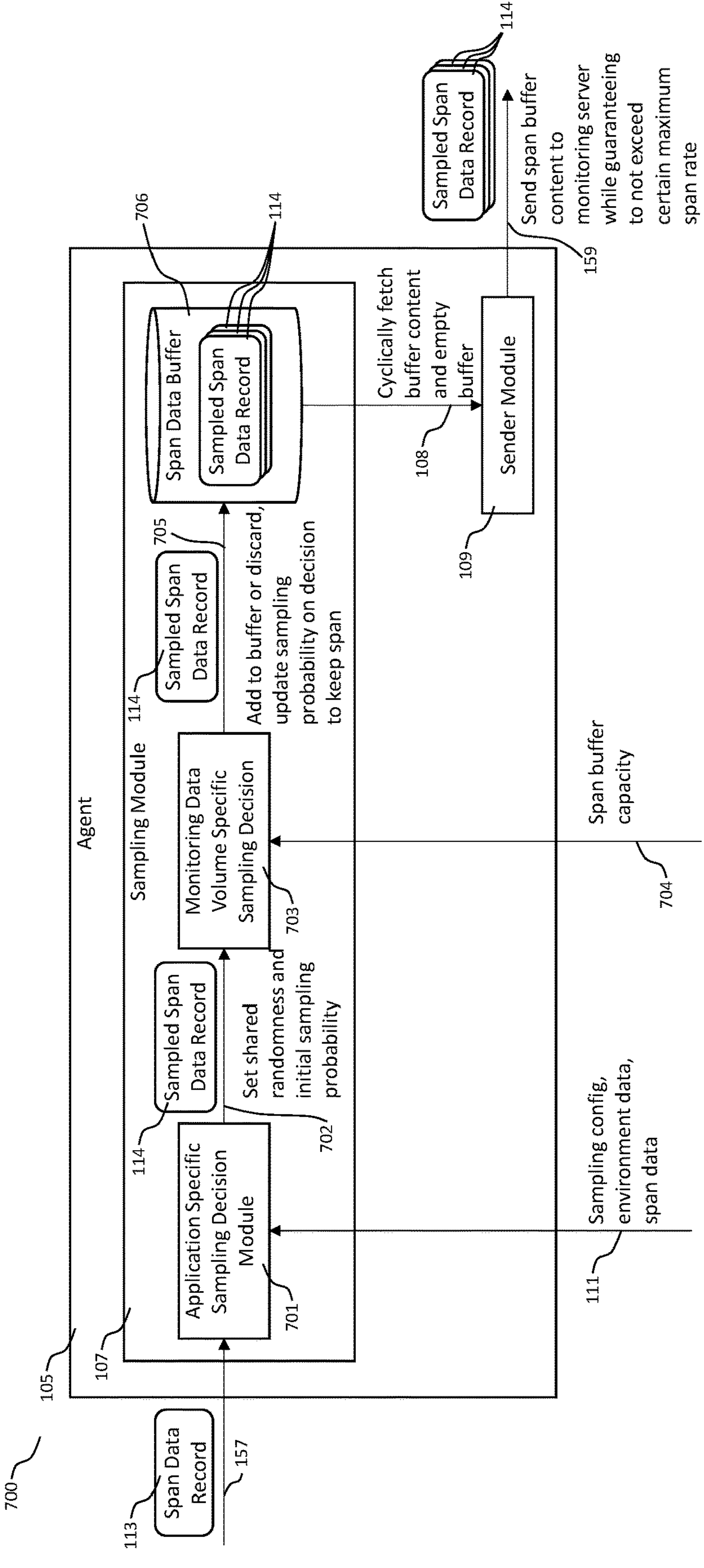
FIG. 7 Consistent Sampling in Combination with Reservoir Sampling Overview

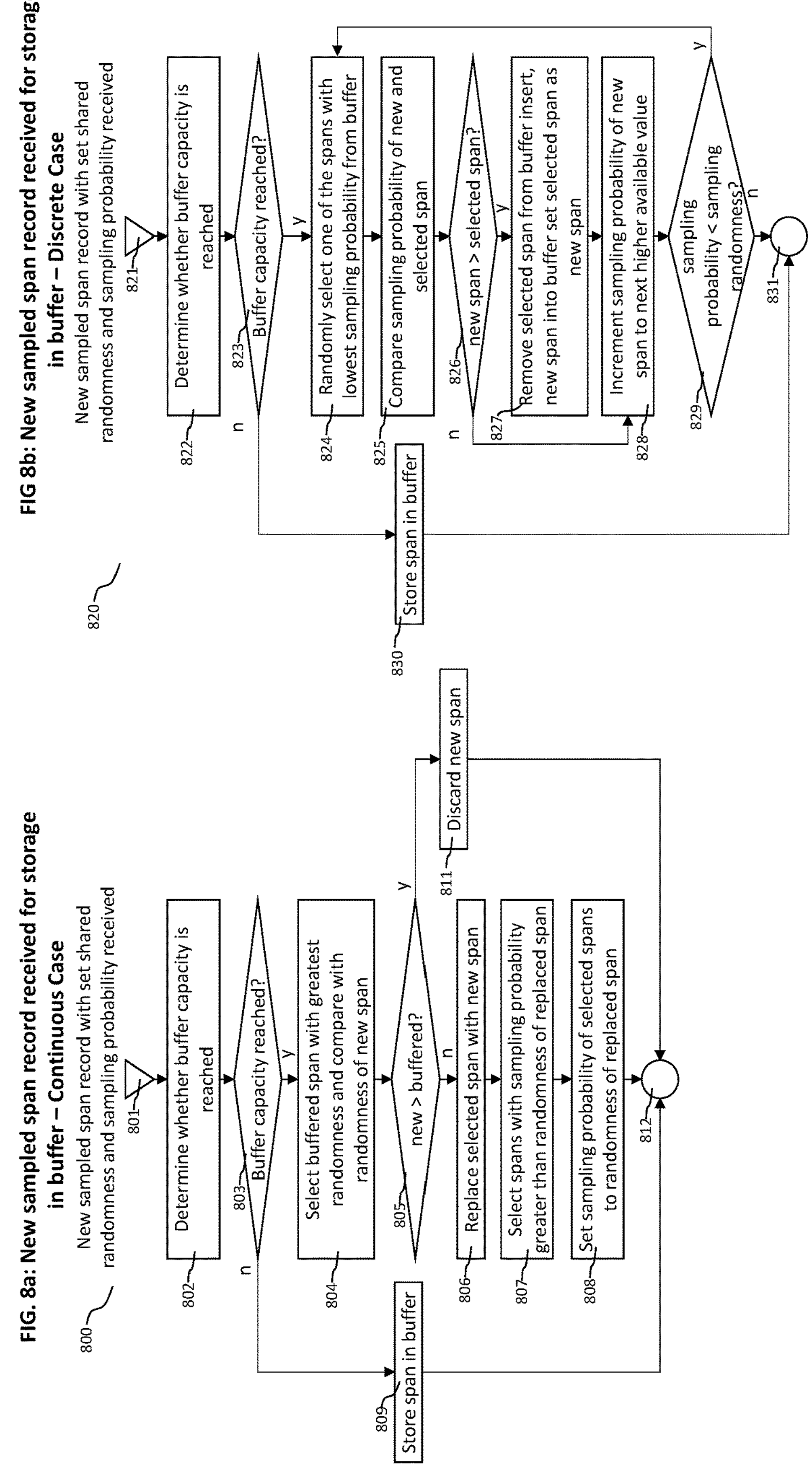
Consistent Sampling in Combination with Reservoir Sampling – Span Replacement Decision
FIG. 8a: New sampled span record received for storage in buffer – Continuous Case
800
New sampled span record with set shared randomness and sampling probability received
801
Determine whether buffer capacity is reached
802
Buffer capacity reached?
803
y
n
Select buffered span with greatest randomness and compare with randomness of new span
804
new > buffered?
805
y
n
Discard new span
811
Replace selected span with new span
806
Select spans with sampling probability greater than randomness of replaced span
807
Set sampling probability of selected spans to randomness of replaced span
808
Store span in buffer
809
812
FIG 8b: New sampled span record received for storage in buffer – Discrete Case
820
New sampled span record with set shared randomness and sampling probability received
821
Determine whether buffer capacity is reached
822
Buffer capacity reached?
823
y
n
Randomly select one of the spans with lowest sampling probability from buffer
824
Compare sampling probability of new and selected span
825
new span > selected span?
826
y
n
Remove selected span from buffer insert, new span into buffer set selected span as new span
827
Increment sampling probability of new span to next higher available value
828
sampling probability < sampling randomness?
829
y
n
Store span in buffer
830
831

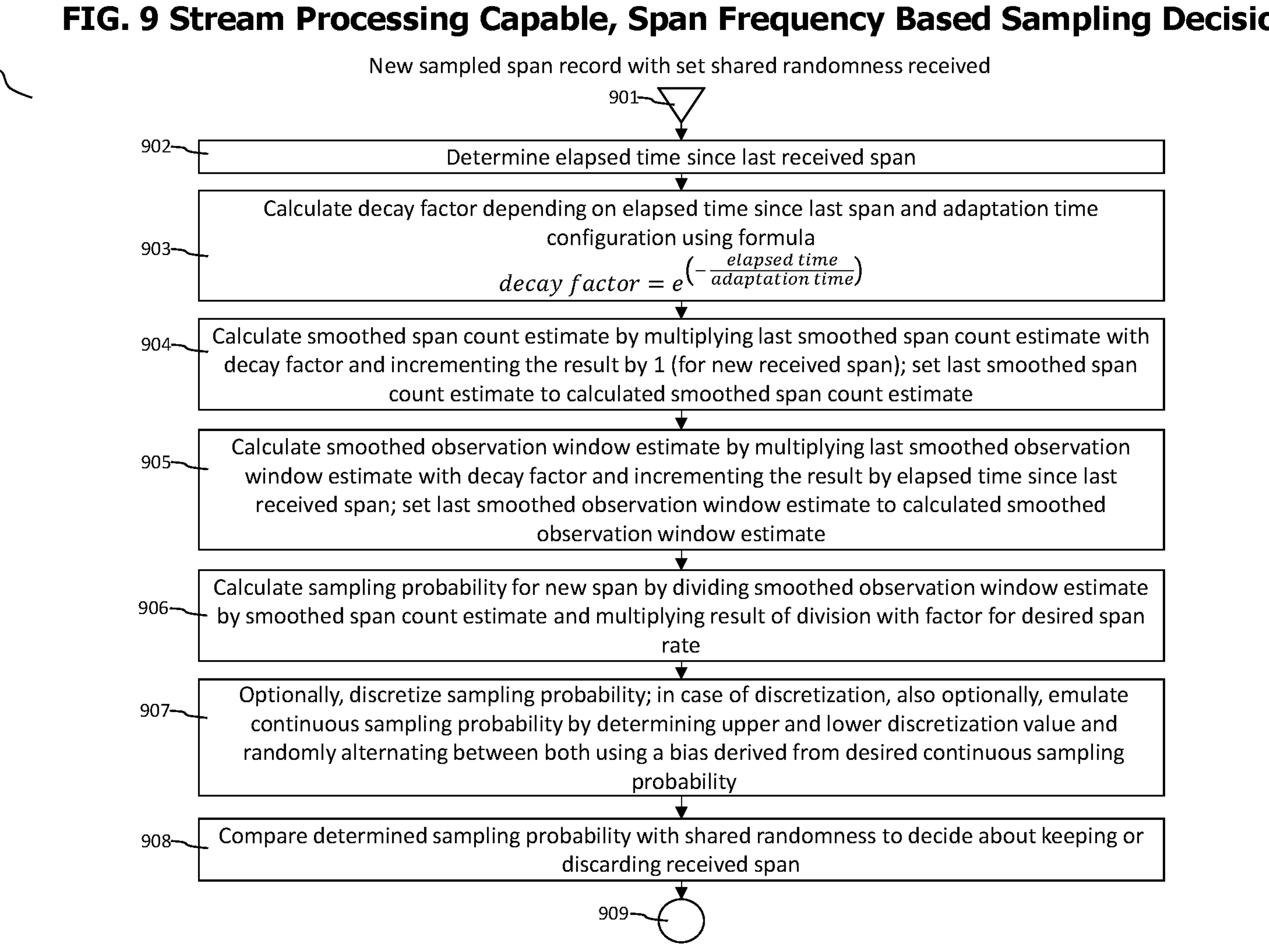
FIG. 9 Stream Processing Capable, Span Frequency Based Sampling Decision
900
New sampled span record with set shared randomness received
901
902
Determine elapsed time since last received span
903
Calculate decay factor depending on elapsed time since last span and adaptation time configuration using formula
$decay\ factor = e^{\left(-\frac{elapsed\ time}{adaptation\ time}\right)}$
904
Calculate smoothed span count estimate by multiplying last smoothed span count estimate with decay factor and incrementing the result by 1 (for new received span); set last smoothed span count estimate to calculated smoothed span count estimate
905
Calculate smoothed observation window estimate by multiplying last smoothed observation window estimate with decay factor and incrementing the result by elapsed time since last received span; set last smoothed observation window estimate to calculated smoothed observation window estimate
906
Calculate sampling probability for new span by dividing smoothed observation window estimate by smoothed span count estimate and multiplying result of division with factor for desired span rate
907
Optionally, discretize sampling probability; in case of discretization, also optionally, emulate continuous sampling probability by determining upper and lower discretization value and randomly alternating between both using a bias derived from desired continuous sampling probability
908
Compare determined sampling probability with shared randomness to decide about keeping or discarding received span
909

OPTIMIZED UNBIASED STATISTICAL ANALYSIS OF PARTIALLY SAMPLED TRACES WITHOUT COMPLETENESS INFORMATION

CROSS-REFERENCE TO RELATED APPLICATIONS

This application claims the benefit of U.S. Provisional Application No. 63/367,503, filed on Jul. 1, 2022. The entire disclosure of the above application is incorporated herein by reference.

FIELD

The invention generally relates to the field of sampling transaction execution monitoring data and more specifically to the consistent sampling of transaction trace data fragments to optimize the probability for complete transaction trace data sets, together with a bias-free estimation of transaction features from incomplete transaction trace data sets.

BACKGROUND

Transaction trace data, which describes detailed performance and functionality aspects of executed transactions, became a crucial source of information for monitoring of proper functionality of applications, and for a fast and targeted remediation of issues causing undesired transaction or application behavior.

The ever-increasing volume of traffic that is processed by monitored applications, together with better and detailed observability of application and transaction execution details provide vast amounts of more transaction monitoring data of higher quality and more detailed information.

Although increased traffic and better visibility are generally a desired development, the sheer amount of generated monitoring data poses a capacity problem for monitoring systems transferring and analyzing this large amounts of monitoring data.

Agents or other monitoring data sources are deployed in or near to monitored applications to acquire and transfer monitoring and transaction trace data to monitoring nodes for storage and analysis. Both processing resources and network capacity used by those monitoring data sources require to be limited as they typically share resources also used by monitored component and should not limit or restrict the usage of resources of those monitored components which are required to fulfill their desired purpose.

Monitoring servers or nodes receive the monitoring data provided by large sets of agents or other monitoring data sources and may therefore also be overloaded by the amount of to be stored and processed monitoring data.

As a consequence, intelligent and statistically unbiased reduction of the monitoring data, which still statistically represents the overall observation data is desired to overcome capacity issues of monitoring data source and processing environment.

Various sampling approaches are applied in the art, which aim to reduce the amount of generated monitoring data while still providing actionable insights into monitored applications. For transaction trace data, which represents one of the most valuable types of monitoring data, usually multiple agents or other monitoring data source provide transaction monitoring data fragments for particular parts of specific individual transactions representing the execution of individual portions of those transaction execution.

To get best and most accurate insight into transaction executions and interdependencies between distinct parts of those executions, it is required to maintain all transaction data fragments of individual transactions. Therefore, a first approach, called "head based" sampling is widely used in the art. With "head-based" sampling, a sampling decision is performed when a new transaction enters a monitored application. An agent deployed to a process receiving a new transaction may, based on overall knowledge of the current load situation and the capacity of the monitoring system, decide whether this whole transaction should be monitored or not. This decision is then forwarded to all other agents that monitor additional parts of the transaction and used by them to determine whether portions of the monitored transactions should be reported. As a consequence, the number of transaction trace data that receives the monitoring server is significantly reduced, but the transaction traces that do reach the server are complete, which is a significant advantage for the analysis of the received transaction trace data.

However, this approach poses some severe shortcomings. First, the capacity to generate and send transaction trace data fragments may be different for different agents deployed to a monitored application. To achieve a monitoring environment that is not overloaded, a head-based sampling approach needs to select its sample rate in a way that the agent having the least capacity of those agent is not overloaded. This leads to most agents not being used to their capacity and therefore to unneeded loss of monitoring data. In addition, to make head-based sampling aware and adaptive to changed load situations on different agents, a back channel would be required that feeds load situation data of downstream agents to corresponding transaction entry agents for recent, load-dependent sampling decisions.

Another common approach is known "tail-based" sampling, which aims to select "most interesting" complete transaction traces, like those describing functional or performance issues for sampling and strongly reduce or completely remove other, "less interesting" transactions indicating normal behavior.

In principle, "tail-based" sampling accumulates and correlates transaction trace fragments from various agents on an intermediate node, which is preferably located near to emitting agents, from a network topology perspective, to minimize network bandwidth utilization. The intermediate node then performs a rudimentary analysis of the completed transaction trace data to identify, and forward to a monitoring node, those transaction traces that were identified to describe unexpected or "interesting" behavior and therefore require additional analysis.

Although it sounds like a good idea to defer the sampling decision until all information about a monitored transaction is available in form of a complete end-to-end trace of the transaction, the additional network bandwidth, processing, and temporal storage requirements caused by this approach, make tail-based sampling approaches unsuitable for large, real-world monitoring scenarios.

As a consequence, a system and method is required in the art that fulfills the need of reduced amount of transaction tracing data, while providing the flexibility to adapt sampling rates according to capacities of individual monitoring agents, maximizing the probability to sample complete transactions and that is capable to perform statistical unbiased estimations or other analyzed for incomplete transaction trace data.

This section provides background information related to the present disclosure which is not necessarily prior art.

SUMMARY

This section provides a general summary of the disclosure, and is not a comprehensive disclosure of its full scope or all of its features.

The present disclosure is directed to a transaction monitoring and tracing system that allows providers of transaction trace data to apply individual sampling rates for transaction trace data, without the requirement of central coordination and orchestration of sampling decisions, which provides sampled transaction trace data in a way that the probability of complete transaction trace data sets is maximized. The generated transaction trace data can be used for an unbiased estimation of features of monitored transactions, even if the transaction trace data describing those transaction is not complete.

Agents or other monitoring data sources deployed to components of a monitored environment recognize executions of monitored transactions by the components to which they are deployed, and report monitored transaction executions to a monitoring server in form of transaction trace data, where the transaction trace data also contains correlation data that identifies individual transaction executions. If a transaction execution leaves the component to which an agent is deployed, e.g., by sending a request to another component, the trace correlation data is added to the request. An agent deployed to the receiving component reads the correlation data and uses it to create transaction trace data describing the execution of the transaction on the receiving component.

A received request containing no correlation data indicates a new transaction execution. In this case the agent creates new correlation data which uniquely identifies the new transaction execution. A random number is also created and added to the correlation data. This random number may then be used by this and all subsequent agents that monitor the execution of the transaction for their sampling decisions. Using the same random number for the sampling decision enables the design of a coordinated and consistent sampling strategy in which the probability of a complete set of transaction trace data is determined by the lowest sampling rate of the involved agents. In a completely uncoordinated sampling approach, where each agent uses its own random sampling mechanism, the probability of a complete set of transaction trace data is defined by the, much lower, product of the sampling rates of all involved agents.

Agents may propagate correlation data, including the shared random number along transaction execution paths to other, downstream, agents. Therefore the whole transaction execution is recognized and traced by all involved agents. The agents may, however, independently decided, based on the shared random number, whether they send monitoring data for an observed transaction execution to a monitoring server.

For better interpretation of sampled transaction monitoring data created by the agents, the monitoring data may include data used for sampling decisions, like the random number that is shared by all agents for the monitoring of an individual transaction, and agent local sampling decision input, like a sampling rate that specifies the rate of observed transaction activities that should also be reported in form of transaction trace data. Sampling decisions may be made on different granularities of monitoring data. In some embodiments, a sampling decision may be made on entry of a transaction, which may be followed by all consecutive agents that monitor the execution of the transaction. In other embodiments, each agent may make its own sampling decision which may be used for all monitoring data for the transaction that is created by the agent. Still other embodiments may perform sampling decisions for even smaller portions of a monitored transaction, like monitoring data describing individual method executions by a monitored transaction.

In some embodiments, data about not sampled portions of a monitored transaction may be created and, if possible, be reported to a monitoring data processor. Those embodiments may count the number of discarded transaction monitoring data elements and forward this information to downstream agents monitoring subsequent execution activities of the transaction. In case one of those downstream agents then samples transaction data, the information about not sampled transaction activity may be added to corresponding reported transaction trace data. As an example, statistics about discarded trace data fragments may be recorded, and an identifier for the last sampled transaction trace data may be forwarded to downstream agents. This data may then be added to the next sampled transaction trace data fragment. This additional data may be used during interpretation of received transaction trace data to represent the amount of missing monitoring data between sampled transaction trace data elements. It may also be used to reconstruct call dependencies and call sequences from incomplete transaction trace data.

Some embodiments may use data describing sampling conditions, like data describing a sampling probability which was used to select sampled transaction trace data fragments to estimate features of monitored transaction executions from incomplete transaction trace data. Variants of those embodiments may restrict the number of different sampling probabilities from which agents may choose to reduce the computational complexity of downstream analysis and extrapolation of sampled transaction trace data. Agents may only be allowed to choose from a limited set of sampling probabilities.

Some of those variant embodiments may restrict sampling probabilities to the elements of a geometric sequence with a positive common ratio that is smaller than 1.0 and with a scale factor of 1.0. A subset of those embodiment variants may select 1/2 as the common ratio of the geometric sequence from which sampling probabilities may be chosen.

A sampling decision by an agent is performed by comparing a shared random number with the local sampling probability of the agent. If only a limited number of sampling probabilities are available, accuracy and resolution of the shared random number may be adapted to those relaxed requirements. If, for example, sampling probability values can only be chosen from a geometric sequence, it is sufficient to represent/transport a shared random value with an accuracy that allows to decide whether the shared random value is greater or smaller than an element of the geometric sequence.

Some embodiments may represent sampling probabilities by the exponent of the selected geometric sequence. As an example, for the geometric sequence with common ratio 1/2, possible sampling rates include 1 (exponent=0), 1/2 (exponent=1), 1/4 (exponent=2), etc. For such a situation it is sufficient to know for the shared random value, in which interval between two elements of the geometric sequence it lies. For the example with common ratio 1/2 this would be the intervals between 1 and 1/2, between 1/2 and 1/4, between 1/4 and 1/8, etc. To encode those intervals, it would be sufficient to store/transmit the exponent of the upper bound of an interval, which would be 0 for the first interval, 1 for the second, 2 for the third, 3 for the fourth interval, etc. Allowing only sampling probabilities and shared random values from a geometric sequence and representing the sampling probabilities/shared random values by the exponents of the geometric sequence leads to a very compact representation of this sampling decision related data which still supports a considerable value range. Restricting sampling probabilities to the first 32 elements of a geometric sequence with common ratio 1/2 results in possible sampling probability values in the range from 1 to $\sim 10^{-9}$ ($1/2^{32}$), while only requiring 5 bit for storage. When restricting to the first 12 elements, which has the advantage that encoded sampling probability and shared sampling random can be stored in only one byte, still sampling probabilities in the range from 1 to $\sim 10^{-5}$ ($1/2^{16}$) can be represented.

For network usage and monitoring data processing capacity reasons, it may be desired to create sampling rates, in form of a specific number of sent transaction trace data fragments per time interval that cannot directly be represented by a selectable sampling probability. To address this problem, some embodiments may, for a specific desired sampling rate that lies between two possible sampling probability, randomly chose between both sampling probabilities, where a bias is applied to the random selection which depends on the relative distance of the desired sampling rate from the two sampling probabilities. As an example, if a sampling rate of 0.7 is desired, a sampling decision system may randomly choose between possible sampling probabilities 1/2 and 1, where the probability to select a sampling probability would be proportional to the relative distance of the desired sampling rate to the opposite sampling probability. For this example, the sampling probability 1/2 would be selected with a probability of 0.3/0.5 (distance between desired sampling rate and opposite sampling probability 1 divided by size of interval containing desired sampling rate) and 1 with a probability of 0.2/0.5. On average and over time, the so selected sampling probabilities will lead to the desired sampling rate 0.7.

To achieve a desired sampling rate over time, some embodiments of monitoring systems may use an agent side buffer for sampled transaction trace data fragment which is populated and managed according to an adapted reservoir sampling strategy. The adapted reservoirs sampling strategy may, in addition to the size of a used buffer and the number of already processed elements, which are already considered by conventional reservoir sampling strategies, also consider sampling probabilities and shared random number to decide whether a received trace data element should be inserted into the buffer or should be discarded.

In some monitoring setups, which require fast insight into acquired monitoring data, buffering of transaction trace data fragments to achieve a desired sampling rate is not possible. A stream processing approach may be used in such situations, which immediately decides for a received trace data fragment if it should be sent or discarded, without storing the received trace data fragment in a buffer.

An exponential smoothing approach may be applied to estimate an average waiting time between the arrival of two consecutive trace data records. Input to data for this estimation include the observed time since receipt of the last and the recent trace data record, the value of a previous wait time estimation and a decay factor defining the weight that the previous wait time estimation should be given, relative to the currently observed wait time. As the decay factor specifies the extent to which previous estimates influence a new wait time estimate, it therefore also defines how fast the estimation adapts to changes of observed waiting times.

The estimated average waiting time may be used, together with the desired trace data reporting rate to calculate a sampling probability, and the so calculated sampling probability may be compared with the shared random value to decide whether a received trace data record should be sampled or discarded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of a transaction monitoring and tracing system that is capable to produce partially sampled transaction trace data, where the generated trace data also includes data describing applied sampling parameters which may be used for a bias-free interpretation of the creates trace data.

FIG. 2 shows data records that may be used to create, transfer and store transaction trace data that also contains sampling parameters.

FIGS. 3*a*-3*d* provide flowcharts of processes that are executed by agents deployed to monitored processes of an application to create sampled transaction trace data including sampling parameters.

FIG. 4 Visualizes space optimizations for the storage and transfer of sampling parameter data that uses quantification of sampling parameters according to a geometric sequence.

Figures 5A, 5B:
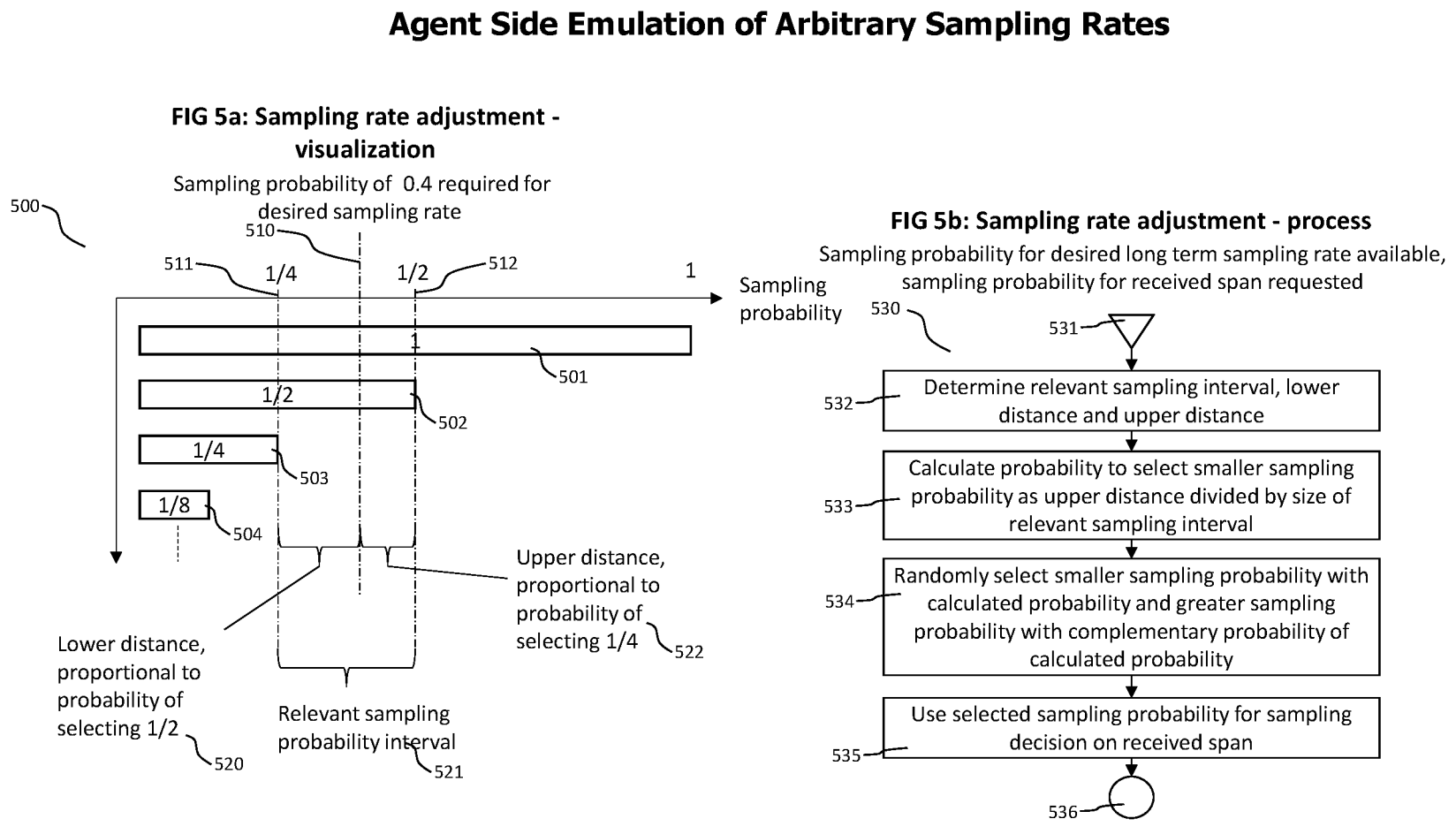

FIGS. 5*a*-5*b* Describe an approach to emulate arbitrary sampling rates by a system that only provides a limited number of fixed, discrete sampling rates.

FIG. 6 Shows the flowchart of a process that evaluates a potential incomplete set of transaction trace data fragments for an individual transaction to create an unbiased estimate for a specific feature of the individual transaction.

FIG. 7 Proposes an agent architecture that combines consistent sampling of transaction trace data fragments with an agent side buffering strategy that is based on reservoir sampling to guarantee a maximum output rate of trace data fragments.

FIGS. 8*a*-8*b* Show flowcharts of processes that manage the reservoir buffer of an agent using sampling parameter data stored in received transaction trace fragments as input for buffering decisions. Flowcharts for environments with continuous and discrete sampling parameters are presented.

FIG. 9 Proposes a stream-based transaction trace data sampling technique, which uses the time that elapsed since the receipt of the last and the current trace data fragment in combination with an exponential smoothing approach to estimate an average transaction trace data frequency. The estimated trace data frequency is used to immediately decide whether a received trace data fragment should be sampled.

Corresponding reference numerals indicate corresponding parts throughout the several views of the drawings.

DETAILED DESCRIPTION

Example embodiments will now be described more fully with reference to the accompanying drawings.

The disclosed technologies are directed to an enhanced sampling approach for monitoring systems creating end-to-end transaction trace data out of transaction trace data fragments provided by distributed trace data sources like agents.

The proposed sampling approach enables agents to individually take sampling decisions for individual trace data fragments. Performing sampling decisions independently and individually enables them to adapt the volume of created monitoring data to their capabilities and context. In some environments, sending monitoring data to a monitoring server may be costly, or limited by networking resources. Some types of agents may analyze already existing, locally available data of monitored transaction execution to select and report transaction tracing data that is considered valuable to judge the situation of a monitored system. As an example, they may prefer to report transactions in which errors or exceptions occurred, because those transactions indicate incorrect or undesired functionality which needs to be corrected.

One downside of individual sampling decisions is that it drastically reduces the probability of complete transaction traces. If a transaction is executed by three processes, each of them sampling trace data fragments with a probability of 0.3, then the probability of getting a complete transaction trace data set is the product of those statistically independent sampling probabilities, which is 0.027. To overcome this issue, the individual sampling decisions may be statistically coupled by using one, shared random value for the sampling decision. This leads to a statistical dependency between those sampling decision, and a probability for a complete set of transaction trace data which is equal to the smallest sampling probability of an agent monitoring the transaction, which would be 0.3 in the current example.

Another issue of individually sampling agents is that this approach creates incomplete sets of transaction trace data and that it is a not trivial mathematical problem to estimate features of a monitored transaction from such incomplete monitoring data. Although mathematical theory to calculate such estimates will be presented here, performing those calculations may cause disproportionate computing costs if agents are allowed to choose arbitrary sampling probabilities. To overcome this issue and to reduce the computing costs caused by the evaluation of incomplete transaction trace data sets, selection of sampling probabilities may be restricted to a finite set of values.

Conceptually, the proposed estimation algorithm processes transaction trace data fragments having the same sampling probability in one iteration. Allowing arbitrary sampling probabilities may theoretically cause an unlimited number of iterations. If only a specific, finite number of sampling probabilities is allowed, the maximum number of iterations equals the number of those allowed sampling probabilities.

Coming now to FIG. 1, which provides a block diagram of a monitoring system that is capable to create and interpret partial transaction tracing data.

Agents 105 are deployed to processes 100 and 103 and receive span data records 113, describing individual method executions of monitored transaction form sensors 150-156, which are instrumented into those methods and report data describing the execution of those methods, like entry/exit of a transaction execution into/out of one of those methods. Each agent 105 contains a sampling module 107, which decides for a received span data record 113 if it should be converted into a sampled span data record 114 and reported 159 to a remote monitoring server 170.

Open Telemetry, a popular open-source monitoring product capable to create transaction trace data describing individual transactions coined the term "span" or "span record" for a portion of transaction trace data describing a single method or function execution performed by a monitored transaction. The terms "span", "span data", or "span data record" are used herein in the same sense as they are used in Open Telemetry.

In the concrete monitoring setup described in FIG. 1, a transaction enters 120 execution thread 1 101 of process 1 100 via an entry method 121. The entry method calls 122 function 1 123 and function 3 126, and function 3 calls 127 function 4 128. Sensors 150 and 151 are instrumented to function 1 123 and 4 128 and report the execution of those functions in form of span data records 113, which are sent 157 to the agent deployed to process 1.

Reporting those method executions in thread 1 also causes the context module 106 of the agent 105 to create or update a trace context record 112 in thread 1. Trace context records 112 are used to store transaction trace management and sensor coordination data, like a unique identifier for a monitored transaction, data describing dependency, nesting, and sequence data for the method executions of a monitored transaction, or a shared random number which may be used for independent but coordinated sampling decisions of individual agents.

Conceptually, the context module 106 may, on receipt of span data from a thread, first determine whether a trace context record already exists in the thread. If one exists, it may update 110 call dependency and call nesting data of the trace context record to consider the new reported method execution.

If no trace context data exists in the thread, the context module creates a new one in the thread and analyzes data for the activity that triggered the reported method execution to determine whether it contained trace context data. Methods that initiate a communication of a thread with another one may be instrumented with a sensor which not only monitors and reports executions of those methods, but also manipulates messages that are created by those methods for the communication with other threads by adding trace context data to those methods. As an example, such a method may create and send a HTTP request to another process. The specific sensor may add an attribute containing trace context data to this request. If this HTTP request is received by another process and processed by a method that is instrumented with a sensor, the context module of the agent injected into this process will read this attribute and create a trace context record in the thread that processes the request using the trace context data that was received with the HTTP request. This mechanism assures that trace context data for a monitored transaction is propagated over thread, process and host computing system boundaries, and that all sensors that monitor and report parts of the execution of a monitored transaction can share data like a transaction identifier or a shared random value which is used by sampling modules 107 of agents to decide whether received span data records 113 should be sampled or discarded.

If no trace context data is available in the message that triggers the first execution of an instrumented method in a thread, this indicates the start of a new monitored transaction. In this case, the context module 106 may create a trace context record in the thread, and initialize it with a new, unique transaction identifier and a new shared random value.

Function 1 calls 124 not instrumented functions 2 125, and function 3 126. Function 3 may call 127 instrumented function 4 128, which in turn calls 129 instrumented function 5 130. Sensors 151 and 152 deployed to functions 4 and 5 may also create span data records 113 describing those executions and send 157 them to the agent 105.

Function 4 128 also sends a message 137 to process 2 103. The sensor 151 instrumented to function 4 detects the sending of the message and adds trace context data 112 containing at least the identifier for the monitored transaction and the shared random value to the sent message.

The sensor 152 deployed to function 5 may also recognize that function 5 communicates with thread 2 102, and therefore add trace context data 112 to the message that is sent 131 from thread 1 101 to thread 2 102.

In thread 2 102, an entry function 132 receives the message from thread 1 and calls 133 function 6 134 which is instrumented with a sensor 153. The sensor reports the call of function 6 with a span data record 113, which is received by the agent 105 of process 1. The context module 106 of the agent may create 110 a trace context record 112 for thread 2, using the trace context data received with the message from thread 1. Function 6 then calls 135 function 7 136. Sensor 154 instrumented in function 7 again sends 157 a span data record 113 describing the monitored execution of function 7 to the agent.

An entry function 138 of thread 3 104 running in process 2 103 receives the message sent by function 4 executed in thread 1. The entry function 138 calls 139 function 8 140 which is instrumented with sensor 155. The sensor reports the execution of function 8 in thread 3 using a span data record 113, and the context module 106 of the agent deployed to process 2 in response creates a trace context record 112 in thread 3, using trace context data received with the request 137 from process 1. Function 8 calls 141 function 9 142, which is instrumented with sensor 156, which reports 158 the execution of function 9 to the agent injected in process 2 103 using a span data record.

Span data records 113 received by agents 105 are forwarded to sampling modules 107, which individually and independently decide for each received span data record if it should be sampled and forwarded 108 to a sender module 109 of the agent. The sender module creates sampled span data records 114 for each received span data record 113 and sends 159 the created sampled span data records 114 to a monitoring server 170 for analysis via a connecting computer network 160.

The monitoring server 170 may forward the received sampled span data records to a span processing unit 171. The span processing unit may perform various analysis and correlation activities, like detecting undesired operation conditions including method or function executions with unexpectedly long execution time or identifying erroneous method or function executions. The span processing unit may in addition use correlation data stored in received sampled span data records to group sampled span data records according to the transaction execution they describe and then create end-to-end transaction trace data describing call dependencies of the methods described by those sampled span data records. After an initial processing performed by the span processing unit, the received sampled span data records 114 are stored 172 in a span repository 173.

A trace feature estimator 176 may receive feature estimation requests 177, containing data to identify one or more transaction execution and one or more features for which an estimation is desired. To process those requests the trace feature estimator 176 may access 175 the span repository to fetch the sampled span data records that are required for the requested estimation. The feature estimator may provide calculated estimation results for further analysis, visualization, or storage.

Section 1.4, "Partial trace sampling" of Appendix A also describes the concept of partial transaction sampling and compares it to known approaches like head-bases and tail-based sampling.

Coming now to FIG. 2, which describes trace context records 112, span data records 113 and sampled span data records 176 in detail, and which proposes a transaction trace record 230, which may be used to store end-to-end transaction trace data generated by a span processing unit.

A trace context record 112 may contain but is not limited to a trace identifier 201, which uniquely identifies a monitored transaction execution, a parent span identifier 202, which identifies the span that described the next enclosing monitored method or function execution, shared sampling randomness data 203, which may be a random number which is accessible for all spans constituting an individual transaction trace and which is used to decide whether individual spans of the individual transaction should be sampled or discarded, an optional last sampled parent span identifier 204, which identifies the next enclosing monitored method or function execution for which the corresponding span data record was not discarded, and an optional number of not sampled intermediate spans 205.

Some embodiments may use random numbers to set trace identifiers. In such embodiments, the trace identifier may also be used as shared randomness data and the separate shared randomness field 203 may be omitted.

Referring back to FIG. 1, process 1 to explain the functionality of parent span identifier 202, last sampled parent span identifier 204 and number of not sampled intermediate spans 205. Considering the state of trace context data for execution of function 5 130 under the assumption that the span data record that was created for the execution of enclosing function 4 128 was sampled. In this case, parent span identifier and last sampled span identifier 204 would both point to the span data record describing the execution of function 4 and number of not sampled intermediate spans would be 0, as the direct parent of function 5 was sampled.

To describe a scenario where intermediate spans are not samples, consider the state of trace context data of thread 3 104, during execution of function 9 under the assumption that the span data record for direct parent function execution 8 was not sampled. In this case, parent span identifier 202 would still refer the unavailable span data record for function 8, but last sampled parent span identifier 204 would identify the span data record for the next enclosing monitored and sampled function execution, which would be the span data record describing the execution of function 4. Number of not sampled intermediate spans would be 1, as there is one not sampled span data record between the sampled span data records for function 8 and function 4.

The benefits of recording and reporting information about discarded transaction trace data fragments are also discussed in section 2.10 "Span Context" of Appendix A.

A span data record 113, which may be used by sensors deployed to functions or methods of a monitored application, to report the execution of those functions or methods, may contain but is not limited to a trace identifier 211 identifying the monitored transaction to which the span record belongs, a span identifier 212 identifying the specific span data record, a parent span identifier 213 identifying the span data record describing the next enclosing monitored function or method execution, and an observation data section 214 containing actual monitoring data for an observed method or function execution.

Observation data 214 may contain but is not limited to context data 215 identifying the executed method or function by name of class and method of an executed method or name of an executed function, and name of a package or component containing the executed method or function, and monitoring data 216, containing data describing the observed method or function execution, like data describing the duration of the execution, resources used for the execution, data indicating a success status of the execution and data describing type and value of the parameters for the observed execution.

A sampled span data record 176, which may be used to send span data from an agent to a monitoring serve, may contain but is not limited to a trace identifier 221, identifying the monitored transaction to which the span belongs, a span identifier 222 and a parent span identifier 223 identifying the span itself and its direct parent span, a shared sampling randomness field 224, containing data shared between all spans of a transaction for sampling decisions, a span sampling probability 225, specifying the sampling probability that was applied for the sampling decision for this span, observation data 226 containing observation data 214 of the corresponding span data record that was used to create the sampled span data record, an optional last sampled parent span identifier 227 identifying the span data record for the next enclosing method or function execution that was sampled, and a number of not sampled intermediate spans which contains the number of span data records that were discarded between the last sampled parent span and the span described by the sampled span data record.

Transaction trace records 230, which may in some embodiments be created by span processing units, represent complete monitored end-to-end transaction executions. Sampled span data records for individual transactions are selected and parent span data relations are used to reconstruct call dependency relationships between individual spans for a specific transaction. Tree data structures, where sampled span data records represent nodes of the data tree, and call dependencies represent the edges of the tree are stored in transaction trace records.

A transaction trace record 230 may contain but is not limited to a trace identifier 231 uniquely identifying the monitored transaction described by the transaction trace record and a span graphs section 232, which contains one or more tree data structures describing the method or function executions that were performed by the monitored transaction and the call dependencies of those executions. Method or function executions are represented by sampled span data records 176, forming the nodes of a tree or graph, and call dependencies extracted from parent span information of sampled span data records represent the edges 233 of the graph.

If all span data records for a monitored transaction are available, or if last sampled parent span information is available, the complete call dependency tree for a monitored transaction can be reconstructed. In this case, one call tree is created.

If span data records are missing, and also last sampled parent span information is not available, multiple call tree fragments may be created, each of those call tree fragments representing a subset of the method or function executions and their call dependencies that can be reconstructed from incomplete transaction trace data.

Coming now to FIGS. 3*a*-3*d*, which conceptual describe one variant of processes that perform agent side span data creation and sending.

FIG. 3*a* describes the processing performed when a monitored method or function is entered, which triggers the creation of a new span data record to describe the execution of the entered method.

The process 300 starts with step 301, when a sensor recognizes the start of a method or function execution. In subsequent step 302, the sensor reports the started execution to the agent 105, which determines if trace context is available for the thread in which the execution is performed. Step 302 may e.g., check a thread local storage for the thread performing the reported execution if it contains a trace context data record.

If trace context data is already available, subsequent decision step 303 may continue execution with step 306.

Otherwise, it may continue with step 304, which creates a new trace context data record 112 in local storage of the thread performing the reported execution. Step 304 may then set trace identifier 201 and parent span identifier 202, by first analyzing an incoming request or message that triggered the reported execution if they contain such trace context data. If a triggering request or message is available and contains trace context data, this received trace context data is used to set trace identifier 201 and parent span identifier 202 of the new created trace context data record. If otherwise no triggering request or message is available, or does not contain trace context data, step 304 may determine and set a trace identifier indicating the start of a new monitored transaction and set the parent span identifier 202 to a value indicating that no parent span exists.

Subsequent step 305 then determines the shared sampling randomness value 203 for the trace context record created by step 304. Step 305 may first check whether a received message or request that triggered the reported execution already contain a shared sampling randomness value, and in this case use it to set the shared sampling randomness value of the created trace context record. Otherwise, step 305 may randomly choose a new shared randomness value for the create trace context record.

Following step 306 may then create a new span data record 113 for the new observed method or function execution, set its trace identifier 211 and parent span identifier 213 to the corresponding values stored in the trace context data, and determine and set a span identifier 212 for the new span data record. Step 306 may then capture and set span context data 215, like identification data for the executed method or function and types and values for execution parameters, and start measurement activities for the reported execution, like starting execution duration measurement.

Afterwards, step 307 may set the span identifier of the span data record created by step 306 as new value for the parent span identifier 202 of the trace context record for the thread performing the reported execution. Further, the agent stores the created span data record until the sensor reports the termination of the now started method or function execution. The process then ends with step 308.

Coming now to FIG. 3*b*, which describes the processing of a notification indicating that the execution of a method or function has ended. The process 310 starts with step 311, when a sensor reports the termination of a method or function execution.

Following step 312 may capture execution termination data, like a return value if the execution was terminated as desired, or data describing an exception that terminated the execution in an unexpected way.

Subsequent step 313 then terminates measurement activities, like terminating execution duration or resource usage measurement. Afterwards, step 314 may fetch the corresponding span data record 113 that was created for the start of the now terminated execution. A local variable may be created and set to a value identifying the span data record when the sensor reported the start of the execution, like the span identifier. This variable may now be used by step 314 to fetch the span data record that was created to report the start of the now terminated execution. Step 314 may then update or set the measurement data 216 of the fetched span data record with measurement data, like execution duration or resource usage data which became available with the termination of the execution.

Following step 315 may then report the new, finished span data record to the sampling module 107 of the agent and step 316 may set the parent identifier 212 of the finished span data record to the parent span identifier 202 of the trace context record 112 of the thread that performed the now terminated execution. The process then ends with step 317.

The processing of identified outgoing inter thread/process or host computing system communication by sensors instrumenting to methods or functions performing this outgoing communication is shown in FIG. 3*c*.

The process starts with step 321, when a sensor detects such an outgoing communication. Following step 322 fetches the trace context data record 112 for the thread executing the method or function that performs the observed communication. Step 332 may then create a copy of the data contained in the trace context data record and make the copy of the trace context data record available for the receiver thread/process/computing system. Step 322 may, e.g., append the trace context data to a message representing the outgoing communication. A sensor injected to method or function receiving the message may then extract the trace context data from the message and store it in the executing thread.

The process then ends with step 323.

The process of sending span data from an agent 105 to a monitoring server 170 is shown in FIG. 3*d*. Span data records 113 may be selected by a sampling module 107 of an agent according to a sampling strategy. The sampled span data records may be forwarded 108 to a sender module 109 and transformed into sampled span data records 114, which may then be transferred to a monitoring server. Sampling and sending of span data may either be performed individually and immediately for each created span data record, or it may be performed on sets of span data records that are intermediately stored by agents to use network capacities more efficiently.

The process starts with step 331, when sending of span data is requested. Various reasons may trigger sending of span data. In embodiments that avoid buffering span data on the agent side to save resources of the monitored application and that aim to fast report monitoring data to a monitoring server for analysis, each span data record may be sent immediately after its creation. Other embodiments may employ agent side buffers to temporarily store recorded span data. In such embodiments, the sending of span data may be triggered when the agent side span buffer reaches a certain filling-level. Following step 332 fetches the shared sampling randomness that is shared between all span data that describes the monitored transaction to which the to be sent span data record belongs. Step 332 may, e.g., fetch the shared sampling randomness data 203 of the trace context data record 112 that is stored in a thread local storage of the thread in which the method or function described by the to be sent span data record was executed. If span data records are buffered before sampling/sending, fetching, and storing the shared sampling randomness data may be performed at the time when the span data record is temporarily stored in the buffer, because the trace context data record 112 may no longer be available at a later point in time.

Subsequent step 333 may then determine a sampling probability for the to be sent span data record. Step 333 may use sampling configuration data, specifying a global sampling probability, or method/function specific sampling probabilities which differ for executed methods or system. In case method/function specific sampling probability configuration data is available, step 333 may analyze context data 215 of the to be sent span data record to determine identification data for the method or function for which an execution is described by the span data record. Using this identification information, step 333 may determine the sampling probability for the span. Determining the sampling probability may also include analyzing the execution monitoring data 216 stored in the span data record and adapting the sampling probability based on the execution monitoring data. As an example, the sampling probability may be increased if the execution monitoring data indicates undesired/unexpected performance behavior (e.g., longer than expected execution time), resource usage or an undesired/unexpected outcome of the execution (e.g., a return value indicating an erroneous execution, termination due to an exception). The rationale behind such an adaptation of the sampling probability is to increase the probability that span data records describing undesired behavior survive the sampling process.

Other context data, like the availability of computing resources or network bandwidth for transferring span data may also be considered to determine the sampling probability.

Afterwards, decision step 334 may compare the fetched shared sampling randomness data with the determined sampling probability. Shared sampling randomness and sampling probability may be available in a comparable form, like a floating-point number in the value range from 0.0 to 1.0, or in a form that can be mapped to this value range, like the exponent of a member of a geometric series with a common ratio in the value range from 0.0 to 1.0.

If the shared sampling randomness value is smaller than the sampling probability, the process continues with step 336, which creates a new sampled span data record 176 using data for trace identifier 221, span identifier 223, parent span identifier 223 and observation data 226 from the processes span data record 113. Shared sampling randomness 224 may be set to the shared sampling randomness value fetched by step 332 and span sampling probability 225 may be set to the sampling probability determined by step 333.

Step 336 may also set last sampled parent span 227 and # not sampled intermediate spans 228 using corresponding values from the trace context record if those values are recorded. In this case, step 336 may then also set the last sampled parent span identifier 204 of the trace context record 112 to the span identifier 212 of the currently processed span data record and set # not sampled intermediate spans 205 to 0. Following step 337 may send the created sampled span data record to the monitoring server 170, and the process then ends with step 338.

If the sampling randomness value is not smaller than the sampling probability, decision step 334 continues the process with step 335, which discards the currently processed span data record and increases the value of # not sampled intermediate spans 205 by one, if this value is recorded. The process then ends with step 338.

Coming now to FIG. 4, which conceptually describes the encoding of a shared randomness value and of a sampling probability as exponent of a member of a geometric sequence. In this example, 1/2 is selected as common ratio of the geometric sequence. The values of this geometric sequence are equal to the reciprocals of powers of two. Restricting sampling probabilities to reciprocals of powers of two generates performance and accuracy advantages during interpretation/extrapolation of sampled monitoring data, as this typically leads to integer valued extrapolation factors.

A number-line 400 representation of the first four elements of a geometric sequence with common ratio 1/2, together with a drawn randomness of 0.15 and a selected sampling probability of 1/4 are used to explain the encoding.

The first element of the geometric sequence with exponent 0 has the value 1, and the second element with exponent 1 has the value 1/2, therefore the first and the second element of the geometric sequence define value range 414 from 1/2 to 1, third element 1/4 and second element 1/2 a value range 413 from 1/4 to 1/2, fourth element and third element form a range 412 from 1/8 to 1/4 and fifth 1/16 and fourth element 1/8 form a value range 411 from 1/16 to 1/8. In this simplified example, only sampling rates 1, 1/2, 1/4, 1/8 and 1/16 are available. The remaining elements of the geometric sequence are represented by the value range 410 from 0.0 to 1/16, which means that in this case sampling probabilities lower than 1/16 cannot be expressed. Indexes 402 are assigned to the value ranges, which may be used to identify and select them. Those indexes may also be interpreted as the upper bound of a selected value range.

A shared sampling random value, like the random value 0.15 is mapped 422 to the index of the value range containing the random value. In the described example, this is interval 2, ranging from 1/8 to 1/4, including the lower bound 1/8 and excluding the upper bound 1/4. The selected sampling probability will be represented 423 by the index of the interval for which the upper bound matches the sampling probability. In the selected example, this is interval index 2.

A sampling decision 424 may be based on the determined interval indexes for shared sampling randomness and for the sampling probability. In the chosen example, the sampling probability has the value of 1/4 and is represented by index 2, as this index maps to a sampling probability of 1/4. The value 0.15 of the shared sampling randomness is also represented by index 2, as it maps to interval 2, ranging from 1/8 inclusive to 1/4 exclusive, which contains the actual shared randomness value. As a consequence, the sampling decision is positive, because the shared sampling randomness is smaller than the sampling probability.

A receiver of sampled data, like a monitoring server 170, may also use the interval indexes to reconstruct 425 sampling probability and shared sampling randomness with required accuracy.

The advantages of choosing elements of a geometric sequence with common ratio 1/2 for the definition of sampling probabilities are also discussed in section 2.8 "Practical Considerations" of Appendix A.

Restricting sampling probabilities to a finite number of fixed values has advantages for the transfer of sampling related data and for the interpretation of sampled transaction trace data, but this also limits the ability to adapt and fine tune the volume of generated monitoring data according to environment related restrictions, like network bandwidth availability or tolerable monitoring overhead. To achieve arbitrary sampling rates in terms of a specific number of sampled span data records per time interval with a limited number of fixed sampling probabilities, a strategy that randomly switches between two of those sampling probabilities may be chosen. A bias may be calculated and applied for the random selection based on the differences between the two available sampling probabilities and the sampling probability corresponding to the desired sampling rate. The biased random selection then selects the two available sampling probabilities in a way, that in sum and over a longer time period, the selected sampling probabilities average out to the sampling probability that creates the desired sampling rate.

Above discussion of restricting sampling probabilities is based on rank relationships between a shared random number that is accessible and used by all agents involved in the observation of a monitored transaction and sampling probabilities independently selected by agents, where the absolute value of shared random number and selected sampling probability are compared to get to a sampling decision.

However, the sampling probabilities may also be defined differently, as long as the sets of random numbers that are included in different sampling probability definitions are in a subset/superset relationship.

As an alternative example, sampling probabilities may be defined by considering the number of leading or trailing set or unset bits of the shared random number. If sampling probabilities are based on the number of leading zero, or unset bits of the shared random number, a sampling probability of 100% may be achieved by observing 0 leading bits and therefore sampling all spans. A sampling probability of 50% may be achieved by sampling only when the first leading bit of the shared random number is zero, a sampling probability of 25% if spans are only sampled for shared random numbers with the first two leading bit set to zero, and so on. This way, the set of shared random numbers that lead to a sampling decision for a specific sampling probability is a subset (all values of the smaller set are contained in the larger set) of the next higher sampling probability and a superset (only values contained in the larger set are also contained in the smaller set) of the next smaller sampling probability. More specifically and by example, random numbers accepted by sampling probability 50% are divisible by two and random numbers accepted by sampling probability 25% are divisible by four. As numbers divisible by four are also divisible by two, sampling probability 50% would select all random numbers that are selected by sampling probability 25% and all random values selected by sampling probability 25% are also contained in the random numbers selected by sampling probability 50%.

Such a definition of sampling probabilities, and also all other definitions of sampling probabilities where the sets of random numbers selected by different sampling probabilities are in a subset/superset relationship are sufficient to achieve a maximized probability (equal to the minimum of the involved sampling probabilities instead of the product of involved sampling probabilities) of complete sets of spans for individual observed transactions.

FIG. 5*a* visualizes such a strategy by example and FIG. 5*b* shows the flow chart of a process implementing it.

In the example described in FIG. 5*a*, a desired sampling rate may be achieved by a sampling probability of 0.4 510. To determine the required sampling rate, the amount of actually created span data records per time interval may be related to the desired amount of sampled span data records per time interval. As an example, one hundred span data records may be created per second, but only an amount forty span data records per second is desired. To achieve this rate of sampled span data records for the current load situation, a sampling probability of 0.4, which samples 40% of the records and discards 60% of them is desired.

Available sampling probabilities may again be selected from the elements of a geometric sequence with common ratio 1/2 and may include 1 501, 1/2 502, 1/4 503 and 1/8 504.

A next lower available sampling probability 511 and a next higher available sampling probability 512 may be selected for the to be emulated sampling probability. For the depicted example with a desired sampling probability of 0.4, this would be 1/4 for the next lower and 1/2 for the next higher available sampling probability. The distance between the desired sampling probability and one of the identified next available sampling probabilities may be used to determine the probability to select the opposite next available sampling probability, and the size of the relevant sampling probability interval 521 may be used to normalize the determined probability to a value between 0.0 and 1.0. In the selected example, the distance between next lower available sampling probability and desired sampling probability is 0.15 (0.4-0.25), and the size of the relevant sampling interval is 0.25 (0.5-0.25), which leads to a probability of 0.6 (0.15/0.25) for selecting the next upper available sampling rate. The probability to select the next lower available sampling probability (0.25) is 0.4 (distance desired sampling probability and next upper available sampling probability 0.1 divided by sampling interval size 0.25).

FIG. 5*b* shows a process 530 that may be executed on a received span data record to determine the appropriate available sampling probability to achieve a desired long term sampling rate.

The process starts with step 531, when a new span data record is received for which the selection of an available sampling probability is required. A desired sampling rate, and also a desired sampling probability to achieve this sampling rate are known.

Following step 532 may then determine the relevant sampling interval and lower and upper distance for the desired sampling probability. Step 532 may first select the smallest available sampling probability that is greater than the desired sampling probability as next greater available sampling probability and the greatest available sampling probability that is smaller than the desired sampling probability as next smaller available sampling probability. Afterwards, step 531 may calculate the size of the relevant sampling interval by subtracting the next greater available sampling probability from the next smaller available sampling probability, calculate a lower distance by subtracting the smaller available sampling probability form the desired sampling probability and calculate the upper distance by subtracting the desired sampling probability from the next greater available sampling probability.

Afterwards, step 533 may calculate the probability to select the next smaller available sampling probability by dividing the upper distance by the size of the relevant sampling interval and following step 534 may then randomly select the smaller available sampling probability with the calculated probability and the greater available sampling probability with the inverse of the calculated probability. More concrete, the calculated probability may have a value from the interval 0.0 to 1.0, and step 534 may draw a random value form this interval. If the random value is smaller than the calculated probability, the next smaller available sampling probability may be selected. Otherwise, the next greater available sampling probability is chosen. Alternatively, step 533 may calculate the probability to select the next greater sampling probability and step 534 may analogously use this probability to select the next greater or smaller available sampling probability.

Following step 535 may then use the available sampling probability selected by step 534 to perform a sampling decision for the received span data record. The process then ends with step 536.

The concept of emulating a desired, arbitrary sampling rate by randomly selecting one of two adjacent sampling probabilities is explained in more detail in section 2.9 "Rate-Limiting Sampling" of Appendix A.

Referring now to FIG. 6, which provides the flowchart of a process that may be used to estimate features of a monitored transaction from incomplete sets of transaction trace data, like samples of span data records from the monitored transaction.

The process starts with step 601, when a set of sampled span data records 176 representing a monitored transaction, and a transaction feature for which an estimation is desired, are received. Transaction features include the number of spans of a transaction, number of spans having a certain feature, like spans in which an exception was thrown, spans describing the execution of a specific method, function, or service. There may also features requested that are based on sets of transactions instead of individual ones, like the average call depth of such a transaction set. The determination of the value of those features may require specific preparations. As an example, to determine an average transaction call depth, it may be required to determine call dependencies between spans of transactions to reconstruct complete or fragmented call trees out of sampled span data records. This call depth information may then be used as input for the estimation of the average call depth.

Following step 602 initializes an accumulated estimation result with the value 0, and subsequent step 603 calculates a first value for a previous estimation by applying a function to calculate the value for the transaction feature for which an estimation is desired on all received sampled span records. The applied function depends on the type of transaction feature for which an estimation is required. Simple examples of desired features would be the number of transactions, number of spans of transactions or number of spans with a certain property. The corresponding functions for those features would be a function always returning one for the feature "number of transactions", a function returning the number of spans for the feature "number of spans of a transaction" or a function returning the number of spans having a certain property for the last exemplary simple transaction feature.

An example for a more complex transaction feature would be an estimate for the average call depth of spans. A function to calculate this transaction feature would require that parent/child dependencies be resolved between the spans of a transaction. This creates tree structures, where spans represent nodes of the tree and call dependencies are represented by edges of the tree. The function would determine the depth of such call trees (deepest nesting level of function calls) in a first step. The call depth estimations for a set of call trees may be accumulated and then divided by an estimate for the number of transactions to get an estimation of the call depth of the monitored transactions.

Afterwards, step 604 is executed, which determines the minimal sampling probability of the received sampled span records, and subsequent step 605 then discards all received sampled span records with a sampling probability that is smaller or equal to the minimum span sampling probability determined by step 604.

Following decision steps 606 then determines if all received sampled span records are now discarded.

If there are still sampled span records available, step 607 is executed which calculates a value for next estimate by applying the function to calculate the requested transaction feature on the remaining sampled span records, followed by step 608 which accumulates the estimation result by first calculating the difference between the previous estimate (calculated in step 603 on the first iteration, for subsequent iteration, the value that was calculated as next estimate in the previous iteration) and the next estimate (calculated by step 607) and dividing the result of the subtraction by the minimum sampling probability determined by step 604. The result of the division is then added to the value of the accumulated estimation.

Subsequent step 609 then sets the value of the previous estimate to the value of next estimate calculated by step 607. Afterwards, the process continues with step 604.

If decision step 606 determines that all sampled span records are now discarded, the process continues with step 610, which calculates the final estimation result by first dividing the current previous estimate by the current minimum sampling probability and adding the result of the division to the accumulated estimation.

Following step 611 may then provide the final estimation result for subsequent analysis, visualization, or storage. The process then ends with step 612.

The estimation of transaction features from incomplete transaction trace data is also discussed in sections 2.6 "New Estimation Approach" to 2.9 "Practical Considerations" of Appendix A.

Coming now to FIG. 7, which provides an overview of an agent architecture that combines a consistent span sampling approach, which aims to maximize the probability of complete sets of span data records for monitored transactions, while at the same time enabling different sampling probabilities for individual recorded spans, with a reservoir sampling approach, which uses a span buffer of a fixed size to achieve a guaranteed maximum rate of sampled span data records, while maintaining a probability that a given span data record is stored in the buffer is independent of the buffer filling level.

Span data records 113 may be received 157 by the sampling module 107 of an agent 105. The received span data records are first processed by an application specific sampling module 701, which may analyze observation data 214 of the received span data record to determine a sampling probability for the span based on application specific data and knowledge. As an example, span data records describing the execution of specific methods or functions may be more interesting/critical, and therefore get a higher sampling probability. Also, execution monitoring data 216 may be used to determine the sampling probability, as execution durations that exceed a specific threshold, or that were terminated by a specific exception may be considered as interesting for a specific application and therefore receive a higher sampling probability. As an example, a generic sampling probability may be defined for all methods, and also an expected or desired execution duration may be specified for each method. If it is observed that the execution time of a specific method exceeds its expected or desired execution duration, the sampling probability for the span representing this method execution may be increased depending on the level at which the expected execution time was exceeded. Some embodiments may linearly increase the sampling probability with exceeded execution time, some quadratic or exponentially.

Another example would increase spans for method executions that showed undesired or unexpected behavior, like returning of an error code or throwing an exception. In these cases, the sampling probability may be increased by a certain constant or multiplied by a certain factor. The value of this increase constant/factor may depend on the type of observed undesired behavior and increase with the severity level of the observed undesired behavior. Returned error codes may get a smaller increase value assigned than recoverable exceptions, which may in turn get a smaller increase value than unrecoverable exceptions.

The application specific sampling decision module 701 may access and use an application specific sampling configuration 111 for its sampling decision. After the sampling probability is determined for a received span data record, it may be compared with the shared sampling randomness for the monitored transaction to which it belongs. In case the sampling probability is greater than the shared sampling randomness, a new sampled span data record 114 is created for the received span data record and forwarded 702 to a monitoring data volume specific sampling decision module 703.

In some embodiments, the application specific sampling decision module may be omitted, and only a reservoir buffer may be used to limit the amount of created sampled span data records. In this case, the same sampling probability may be used for all received span data records. A typical value for such a default sampling probability would be 0.5 (for a probability value range from 0.0 indicating a certain discard and 1.0 indicating a certain sampling of a span data record), as equalizes the probabilities for discarding and sampling a span data record.

The monitoring data volume specific sampling decision module 703 may use 704 the capacity of the span data buffer 706, the sampling probability and the shared sampling randomness to determine whether a received sampled span data record is added 705 to the span data buffer 706 or discarded. FIGS. 8*a* and 8*b* describe this decision process in more detail, for continuous and discrete sampling probabilities.

A sender module 109 cyclically fetches 108 the sampled span data records 114 stored in the span data buffer 706 and sends 159 them to a monitoring server for analysis. The span data buffer 706 is cleared afterwards. The rate of sent sampled span data records 114 is defined by the capacity of the span data buffer 706 and the sending frequency of the sender module.

Coming now to FIGS. 8*a* and 8*b*, which provide flowcharts of processes that may be used by a monitoring data volume specific sampling decision module 703 to decide whether a received sampled span data record should be stored in the span data buffer 706. FIG. 8*a* describes a processing variant for arbitrary sampling probabilities and FIG. 8*b* describes a processing variant for sampling probabilities that are chosen from a limited, predefined set of available sampling probabilities.

The processing variant for arbitrary sampling probabilities 800, start with step 801, when a new sampled span data record 114 is received and a decision whether to discard it or store it in the span data buffer is required.

Following step 802 may determine whether the capacity of the span data buffer is reached, and the new sampled span data record could only be stored by replacing another, already buffered sampled span data record.

If the buffer capacity is not yet reached, decision step 803 continues with step 809, which stores the received sampled span data record in the buffer. After step 809, the process terminates with step 812.

If the buffer capacity is already reached, the process continues with step 804, which selects the span data record that is currently stored in the span data buffer that has the highest shared randomness and compares it with the shared randomness of the received span data record.

Following decision step 805 continues with step 811, which discards the new span data record if the shared randomness of the new span data record is greater than the highest shared randomness of a buffered span data record. The process ends after step 811 with step 812.

If otherwise the shared randomness of the new span data record is smaller than the highest buffered shared randomness, decision step 805 continues with step 806, which removes the span with highest shared randomness from the buffer and adds the new span data record to the buffer.

Following step 807 then selects buffered span data records with a sampling probability that is greater than the shared sampling randomness of the replaced span data record and subsequent step 808 then sets the sampling probability of the buffered span data records selected by step 807 to the value of the shared sampling randomness of the span removed by step 806.

The process then ends with step 812.

FIG. 8*b* describes the processing 820 of a received span data record in an environment where only a limited set of predefined sampling probabilities are available. The process starts with step 821, when a new sampled span data record with set sampling probability and set shared sampling randomness is received. Following step 822 then determines whether the span data buffer 706 is already full. If the buffer is not full, decision step 822 continues the process with step 830, which stores the received sampled span data record in the buffer. The process then ends with step 831.

If otherwise the buffer capacity is already reached, decision step 823 continues the process with step 824, which randomly selects one of the buffered samples span data records having the lowest sampling probability. As there is only a restricted number of different sampling probabilities available, it is highly likely that multiple sampled span records are stored in the buffer which all have their sampling probability set to the lowest available value.

Subsequent step 825 then compares the sampling probability of the received sampled span data record with the sampling probability of the sampled span data record selected by step 824.

If the sampling probability of the new span data record is greater than the sampling probability of the selected already buffered span data record, decision step 826 continues with step 827, which removes the selected span data record from the buffer, inserts the new received span data record into the buffer and sets the removed span data record as the new span data record.

After step 827, or if the sampling probability of the new received span data record is not greater than the sampling probability of the span data record that was selected by step 824, step 828 is executed, which updates the sampling probability of the new span data record to the next higher available sampling probability.

Following decision step 829 then compares the sampling probability of the new span data record with its shared randomness and terminates the process with step 813 if the sampling probability of the new span data record is smaller than its sampling randomness, which effectively discards the currently selected new span data record.

Otherwise, if the 813 if the sampling probability of the new span data record is not smaller than its sampling randomness, the process continues with step 824.

The aim of processes 800 and 820 is to achieve a buffer management strategy that selects span data records for buffering or eviction in a way that maximizes the probability of complete sets of transaction traces. As selecting a given span data record to be stored in the span data buffer and in turn removing an already stored span data record from the buffer also represents a form of sampling, data describing the sampling conditions, like the sampling probability may be updated for a span that is selected to replace an already buffered one.

Coming now to FIG. 9, which shows the flow chart of a process that performs a stream-oriented processing of received span data records, which determines on-the-fly, and without buffering, if received sampled span data should be recorded or discarded. An exponential smoothing approach is used to aggregate data about previous span data frequencies, which is used to calculate a sampling probability for new received span data records.

The process starts with step 901, when a new sampled span data record is received. Shared sampling randomness data 224 may be set for the received sampled span data record, but a sampling probability 225 may not be set.

Following step 902 then determines the time that has elapsed since the previous receipt of a sampled span data record and subsequent step 903 calculates a decay factor, which controls the influence that older observations of received span data records have on the estimation of a current span data frequency. Next to the time between the receipt of the current and the last span data record, as determined by step 902, also an adaptation time value is used for the decay factor calculation. The adaptation time may be used to adjust the speed with which the streaming system reacts on frequency changes. A high adaptation time value leads to an inert system which reacts slowly to frequency changes, whereas a short adaptation time value leads to agile behavior which reacts quickly on frequency changes. To calculate the decay factor, step 903 may first divide the elapsed time by the adaptation time and then negating the result of the division.

Euler's number is then taken to the power of the negative division result to get the decay factor.

Following step 904 may then calculate a smoothed span count estimate for the currently received span data record by multiplying a last smoothed span count estimate (which was calculated for the previously received span count estimate) with the decay factor calculated by step 903 and then incrementing the result of the multiplication by one to represent the new received span data record. Step 904 may also store the calculated smoothed span count estimate as last smoothed count estimate for the next received span data record.

Afterwards, step 905 may calculate a smoothed observation window estimate by multiplying the last smoothed estimation window estimate with the decay factor and then increment the result of the multiplication by the elapsed time since the receipt of the current and the previous span data record. Step 905 may also store the smoothed observation window estimate as last smoothed estimation window estimate for the next observation window estimation.

Following step 906 may then calculate a sampling probability value by dividing the smoothed observation window estimate by the smoothed span count estimate to calculate a smoothed estimate of the inverse frequency with which span data records are received. The result of the division is then multiplied by a factor representing a desired span rate to get the sampling probability rate. The span rate factor may be notated as a desired number of spans per time interval.

Optional step 907 may then discretize the sampling probability calculated by step 906, in case only a limited amount of sampling probability values is available. In this case, also an emulation of a desired sampling rate that matches none of the available sampling probabilities may be performed, as already described in FIG. 4.

Following step 908 may then compare the previously determined sampling probability with the shared randomness of the received sampled span data record to determine whether it should be reported or discarded.

The process then ends with step 909.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for reporting transaction trace data for a computer transaction executing in a distributed computing environment, comprising:

receiving, by an agent, span data from a sensor instrumented in a given method executed by a monitored computer transaction, where the span data describes a portion of execution of the monitored computer transaction performed by the given method and includes a unique identifier for the monitored computer transaction;

retrieving, by the agent, a shared sampling number for the monitored computer transaction from a data store;

randomly selecting, by the agent, a value for the shared sampling number and storing the value for the shared sampling number in response to the shared sampling number not being present in the data store, where value for the shared sampling number is randomly selected from a limited set of values;

detecting, by the agent, an event of the monitored computer transaction that crosses an execution boundary of a thread, a process or a host computing system and making the unique identifier and the shared sampling number for the monitored computer transaction accessible to other agents in response to detecting said event;

determining, by the agent, a sampling probability for the span data, where the sampling probability defines a percentage of span data reported by the agent and a value for the sampling probability is selected from the limited set of values;

comparing, by the agent, the shared sampling number to the sampling probability;

appending, by the agent, the sampling probability to the span data; and sending, by the agent, the span data as a sampled span data record via a network to a monitoring server, where the sampled span data record is sent to the monitoring server in response to the shared sampling number being less than the sampling probability.

2. The method of claim 1 further comprises discarding, by the agent, the span data in response to the shared sampling number being greater than or equal to the sampling probability.

3. The method of claim 1 wherein each value in the limited set of values is greater than zero, smaller than or equal to one and where a given value in the limited set of values is a multiple of another given value in the limited set of values.

4. The method of claim 1 wherein each value in the limited set of values is a reciprocal of a power of two.

5. The method of claim 1 wherein transaction trace data is a set of sampled span data record, each sampled span data record includes the unique identifier for the monitored computer transaction, a unique identifier for the given method, a sampling probability determined by the agent, and observation data for a given metric describing execution of the given method, and each sampled span data record in the set of sampled span data records has same unique identifier for the monitored computer transaction.

6. The method of claim 5 further comprises adjusting, by the agent, the sampling probability for the span data based on computing resources available on the computing device hosting the agent.

7. The method of claim 5 further comprises adjusting, by the agent, the sampling probability for the span data based on type of method associated with the set of span data records.

8. The method of claim 5 further comprises detecting, by the agent, an undesired execution outcome and adjusting the sampling probability for the span data in response to detecting the undesired execution outcome.

9. The method of claim 1 further comprises maintaining, by the agent, a unique identifier for last sampled span data record sent to the monitoring server in the data store;

maintaining, by the agent, a counter indicating number of span data not reported to the monitoring server in the data store;

discarding, by the agent, span data and incrementing the counter by one in response to the shared sampling number being greater than or equal to the sampling probability;

creating a sampled span data record from the span data, where the sampled span data record includes unique identifier for last span sent to the monitoring server and the counter value, where the sampled span data record is created in response to the shared sampling number being less than the sampling probability.

10. The method of claim 9 further comprises setting the unique identifier for the last sampled span data record to an identifier for current span data and setting the counter to zero in response to the shared sampling number being less than the sampling probability.

11. The method of claim 1 further comprises receiving, by the agent, a desired sampling rate;

identifying a first sampling probability from the limited set of values, where the first sampling probability is closest value in the limited set of values that is smaller than the desired sampling rate;

identifying a second sampling probability from the limited set of values, where the second sampling probability is closest value in the limited set of values that is larger than the desired sampling rate;

performing a sampling decision for a plurality of sampled span data records using the first sampling probability and the second sampling probability, where the sampling decision randomly selects either the first or the second sampling probability, such that the desired sampling rate is achieved for the plurality of sampled span data records.

12. The method of claim 5 wherein sending the span data further comprises storing the sampled span data records in a buffer on the computing device hosting the agent, periodically fetching the stored sampled span data records from the buffer and sending the fetched sampled span data records to the monitoring server.

13. The method of claim 11 further comprises appending, by the agent, the shared sampling number to the span data;

receiving, by the agent, a new sampled span data record;

in response to the buffer being full, selecting, by the agent, a given sampled span data record stored in the buffer and having highest shared sampling number;

comparing, by the agent, shared sampling number associated with the new sampled span data record to the shared sampling number from the given span data record;

replacing, by the agent, the given sampled span data record in the buffer with the new sampled span data record in response to the shared sampling number associated with the new sampled span data record being larger than the shared sampling number from the given sampled span data record; and discarding, by the agent, the new sampled span data record in response to the shared sampling number associated with the new sampled span data record being smaller than the shared sampling number from the given sampled span data record.

14. The method of claim 11 further comprises appending, by the agent, the shared sampling number to the span data;

receiving, by the agent, a new sampled span data record, in response to the buffer being full;

b) randomly selecting, by the agent, a given sampled span data record stored in the buffer, where the given span data record has lowest sampling probability;

c) comparing, by the agent, sampling probability associated with the new sampled span data record to the sampling probability from the given sampled span data record;

d) replacing, by the agent, the given sampling span data record in the buffer with the new sampled span data record in response to the sampling probability associated with the sampled new span data record being larger than the sampling probability from the given sampled span data record;

e) updating, by the agent, the sampling probability associated with the new sampled span data record;

f) comparing, by the agent, the sampling probability associated with the new sampled span data record to shared sampling number of the new sampled span data record; and repeating steps b)-f) in response to the sampling probability associated with the new span data record being less than the shared sampling number of new sampled span data record.

15. The method of claim 5 further comprises receiving, by the agent, a new span data record;

determining, by the agent, a current elapsed time between receiving the new span data record and the span data record most recently received by the agent;

calculating an estimate for the average elapsed time between receipt of span data records by aggregating the current elapsed time with previously observed elapsed times between receipt of span data records; and determining, by the agent, a sampling probability for the new span data record in part based on the estimated average elapsed time such that magnitude of the sampling probability correlates inversely with the estimated average elapsed time.

* * * * *